(12) United States Patent
Gutowitz

(10) Patent No.: US 9,189,156 B2
(45) Date of Patent: Nov. 17, 2015

(54) KEYBOARD COMPRISING SWIPE-SWITCHES PERFORMING KEYBOARD ACTIONS

(76) Inventor: Howard Gutowitz, Brooklyn, NY (US)

( * ) Notice: Subject to any disclaimer, the term of this patent is extended or adjusted under 35 U.S.C. 154(b) by 872 days.

(21) Appl. No.: 13/384,314

(22) PCT Filed: Jul. 14, 2010

(86) PCT No.: PCT/US2010/041979
§ 371 (c)(1),
(2), (4) Date: Jan. 16, 2012

(87) PCT Pub. No.: WO2011/008861
PCT Pub. Date: Jan. 20, 2011

(65) Prior Publication Data
US 2012/0119997 A1    May 17, 2012

Related U.S. Application Data

(60) Provisional application No. 61/270,843, filed on Jul. 14, 2009.

(51) Int. Cl.
| | | |
|---|---|---|
| *G06F 3/0488* | (2013.01) | |
| *G06F 3/02* | (2006.01) | |
| *G06F 3/023* | (2006.01) | |
| *G06F 3/0354* | (2013.01) | |
| *H04M 1/23* | (2006.01) | |

(52) U.S. Cl.
CPC .......... *G06F 3/04886* (2013.01); *G06F 3/0219* (2013.01); *G06F 3/0235* (2013.01); *G06F 3/0237* (2013.01); *G06F 3/03547* (2013.01); *G06F 3/04883* (2013.01); *H04M 1/23* (2013.01); *H04M 2250/22* (2013.01); *H04M 2250/70* (2013.01)

(58) Field of Classification Search
CPC ..................................................... G06F 3/04883
See application file for complete search history.

(56) References Cited

U.S. PATENT DOCUMENTS

| | | |
|---|---|---|
| 2006/0103633 A1 | 5/2006 | Gioeli |
| 2008/0158024 A1 | 7/2008 | Steiner et al. |
| 2008/0165149 A1 | 7/2008 | Platzer et al. |
| 2008/0316183 A1* | 12/2008 | Westerman et al. .......... 345/173 |
| 2009/0146848 A1 | 6/2009 | Ghassabian |
| 2010/0164879 A1* | 7/2010 | Doktorova et al. ........... 345/173 |

FOREIGN PATENT DOCUMENTS

| | | |
|---|---|---|
| KR | 10-2002-0037727 A | 5/2002 |
| WO | WO 0075765 A1 | 6/2000 |

OTHER PUBLICATIONS

International Application Serial No. PCT/US10/41979, Search Report mailed Mar. 1, 2011, 7 pgs.

* cited by examiner

*Primary Examiner* — Gerald Johnson

(57) ABSTRACT

The present disclosure provides for an ambiguous keyboard comprising at least two switches for performing keyboard actions, at least one of the two switches being a swipe-switch. The swipe switch can alter at least one characteristic selected from a group including: a) a function of at least one switch of the at least two switches of the ambiguous keyboard; and b) a mode of a second swipe-switch of the ambiguous keyboard.

20 Claims, 28 Drawing Sheets

Fig. 16
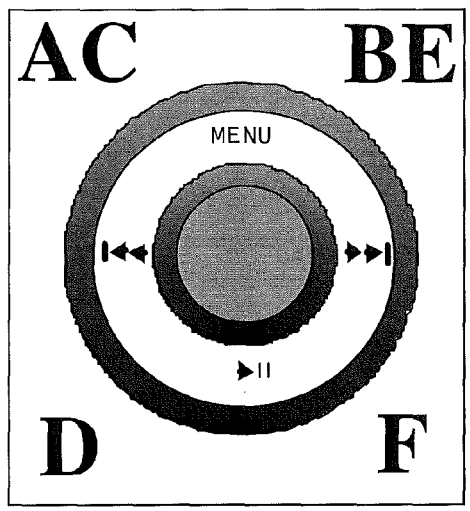
A
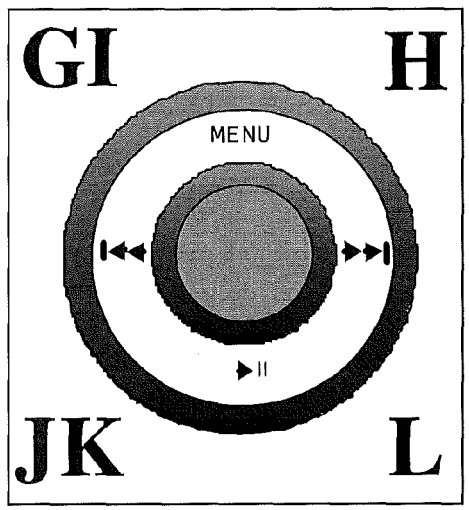
B
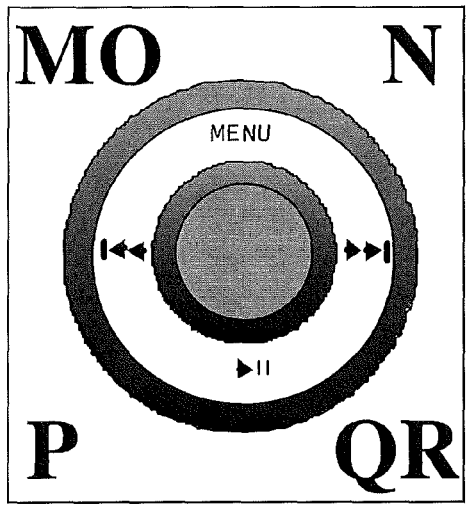
C
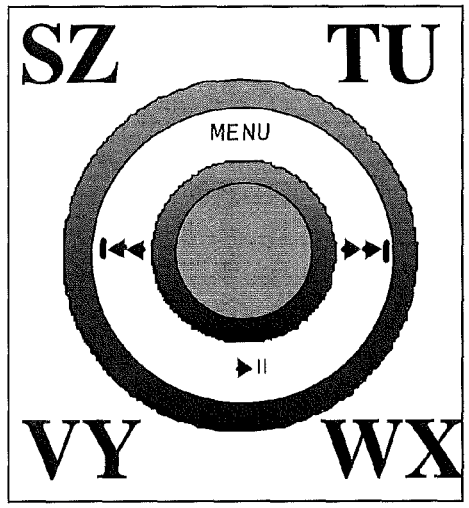
D

Fig. 17
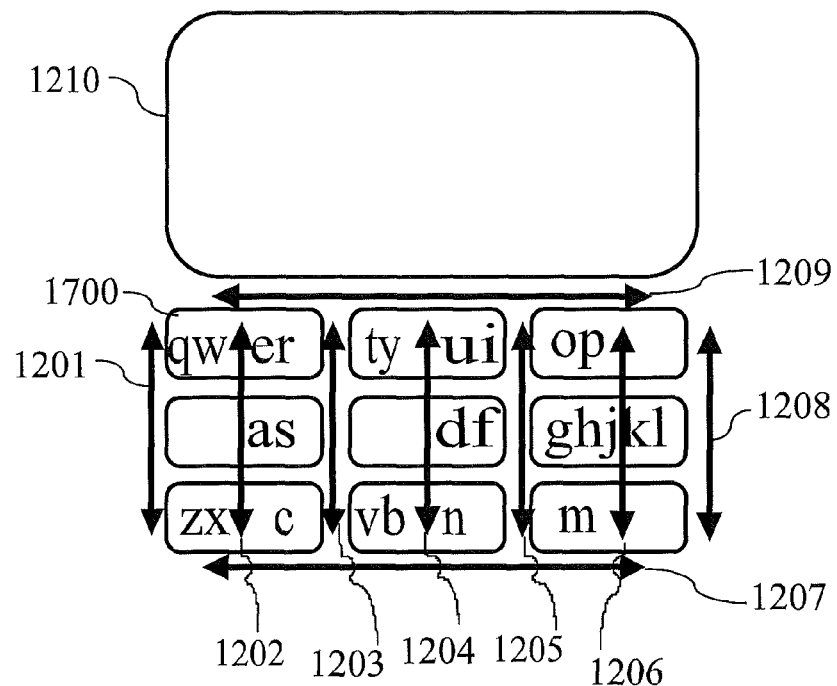
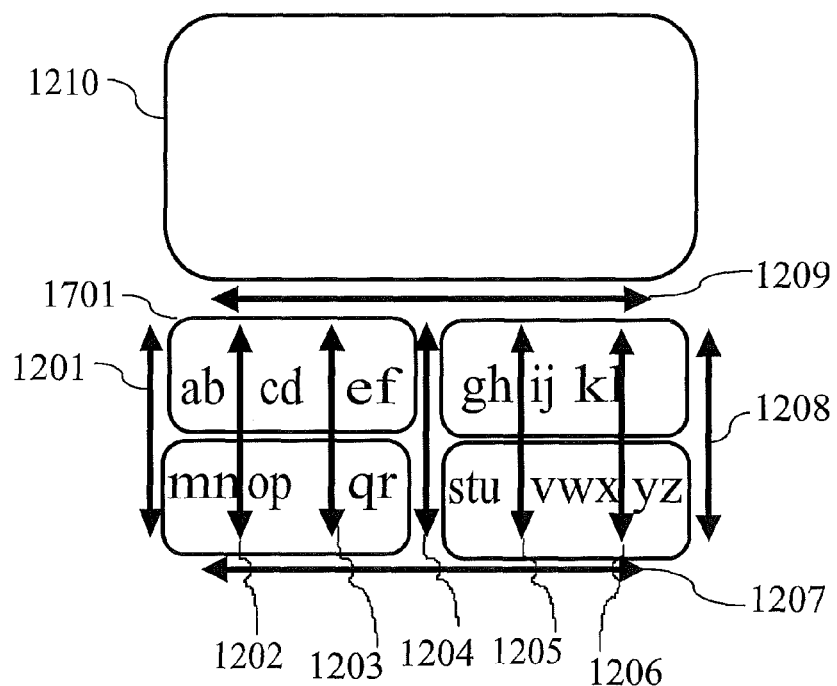

KEYBOARD COMPRISING SWIPE-SWITCHES PERFORMING KEYBOARD ACTIONS

CROSS REFERENCE TO RELATED APPLICATION

This application is a U.S. National Stage Filing under 35 U.S.C. 371 and claims the benefit of priority under 35 U.S.C. §120 to International Patent Application Serial No. PCT/US2010/041979, filed Jul. 14, 2010, and published on Jan. 20, 2011 as WO 2011/008861 A2, and republished as WO 2011/008861 A3, which claims the benefit of U.S. Provisional Application Ser. No. 61/270,842, filed on Jul. 14, 2009, entitled "KEYBOARD COMPRISING SWIPES SWITCHES PERFORMING KEYBOARD ACTIONS," to Howard Gutowitz commonly assigned with this application and each of which are hereby incorporated herein by reference in their entirety.

INTRODUCTION AND BACKGROUND

We distinguish two types of controls: swipe controls and switches. Non-limiting examples of swipe controls include variable capacitors and resistors which change their capacitance, respectively resistance as a knob is turned. Another non-limiting example of a swipe control is a computer mouse: as the mouse is moved a cursor on the screen moves. In swipe controls, a physical motion along some path is transformed into the continuous adjustment of some property or signal. A switch, by contrast, transforms a physical action into a binary state change or signal. A non-limiting example of a switch is the familiar electric switch for turning a light on and off. These types of controls are of an increasing importance in today's world, and there can be implementation and design issues concerning them.

SUMMARY OF THE CLAIMS

In one aspect, the present disclosure provides for an ambiguous keyboard comprising at least two switches for performing keyboard actions, at least one of the two switches being a swipe-switch. The swipe switch can alter at least one characteristic selected from a group including: a) a function of at least one switch of the at least two switches of the ambiguous keyboard; and b) a mode of a second swipe-switch of the ambiguous keyboard.

In a certain aspect, the ambiguous keyboard further comprises: a hold areas, which, when used in conjunction with the at least one swipe-switch, perform a hold action for the swipe-switch, forming a swipe-switch-old control. In certain further various aspects, the keyboard is responsive to two or more different kind of swipes. The different kinds of swipes include at least one of: a linear swipe; an open arc; a path curved on itself; a zig-zag curve; a pull apart swipe; and a two finger swipe wherein fingers move along parallel lines opposite each other. An entire surface of the keyboards is sensitive to a plurality of swipes, wherein the swipe is one of the plurality of swipes. The plurality of swipes can overlap a same key area.

In still other various aspects, a space bar of the keyboard is replaced by the swipe-switch. The keyboard comprises three swipe-switches, wherein the three swipe-switches are all responsive to upwards swipes. The swipe-switch is at least one of between a row of keys of the keyboard; and between a column of keys of the keyboard. Alternatively, the swipe-switch is at a border of the keyboard. The swipe-switch is one of the plurality of swipes.

In still further aspects, the keyboard comprises a plurality of swipe-switches, wherein the swipe-switches can be used as described selected from the group comprising at least one of: a) activated in combination; b) activated simultaneously; and c) activated sequentially, to represent actions distinct from an action represented from actions associated with each of the plurality of swipe-switches. The keyboard can employ a Qwerty layout. The swipe-switch is useable as a lockable and holdable meta-key. The lockable and holdable meta-key is at least one selected from a group comprising: an end of set (EOS) lock; and an EOS hold. The keyboard is an ambiguous keyboard. The keyboard is coupled to an iPod®.

In still yet further aspects, wherein an activation mechanism of the keyboard determines a swipe bath through employment a distance from a received swipe to a predefined line. The distance can be computed with an employment of a calculation concerning an inverse square of a distance from the received swipe to the predefined line. The ambiguous keyboard includes exactly four keys.

In a yet further aspect, a keyboard comprises four quadrants, wherein a plurality of keys are assigned to a given quadrant of each quadrant, and wherein two thumbs are employable at a same time to select a key from each of the four quadrants. The letter "s" can be assigned to a third quadrant of the keyboard. In a yet still further aspect, one thumb is used to select a letter.

In still yet another aspect, the present disclosure provides a method, comprising: selecting a keyboard design into which at least on swipe-switch is to be incorporated; selecting a subset of keys from the keyboard to be replaced by at least one swipe-switch; and replacing the subset of keys from the keyboard with the at least one swipe-switch. In some aspects, the method determines in a first decision if any of the subset of keys are at least one of: a) a shift key; and b) a lock key. In one embodiment, if the first decision is an affirmative: The method can further include determining in a second decision if the subset keys are to be replaced by a functional switch-swipe, including at least one of: a) a swipe-switch hold; and b) a swipe-switch lock; and c) an EOS variant of the s swipe-switch hold or the swipe-switch lock. The functional switch-type is replaced with at least one of: a) a swipe-switch hold; and b) a swipe-switch lock; c) an EOS variant of the swipe-switch hold or the swipe-switch lock.

A yet still further aspect provides a system, comprising: a keyboard, and a first swipe-switch and a second swipe-switch included within the keyboard; wherein the first swipe-switch is configured to interact with a second swipe-switch of the keyboard, wherein a characteristic of a key of the keyboard is altered due to the interaction. The characteristics can be altered is a change of a function of the key.

In a even yet still further aspect, a keyboard system comprises an activation mechanism; and a keyboard coupled to the activation mechanism; wherein: a) the keyboard is configured to receive a swipe; and b) the activation mechanism is configured to compare the received swipe to a plurality of ideal swipes to calculate a calculated swipe. At least one of the ideal swipes can be an up and down motion.

BRIEF DESCRIPTION OF THE DRAWINGS

This invention will be described in detail in reference to a sequence of drawings, a brief description of which follows:

FIG. 16. Second-stroke letter assignments for the illustrative keyboard of FIG. 15.

FIG. 17. A keyboard incorporating a fixed set of swipe-switches, and alternate keyboard arrays.

DETAILED DESCRIPTION

Illustrative Types of Swipes

Figure 1:
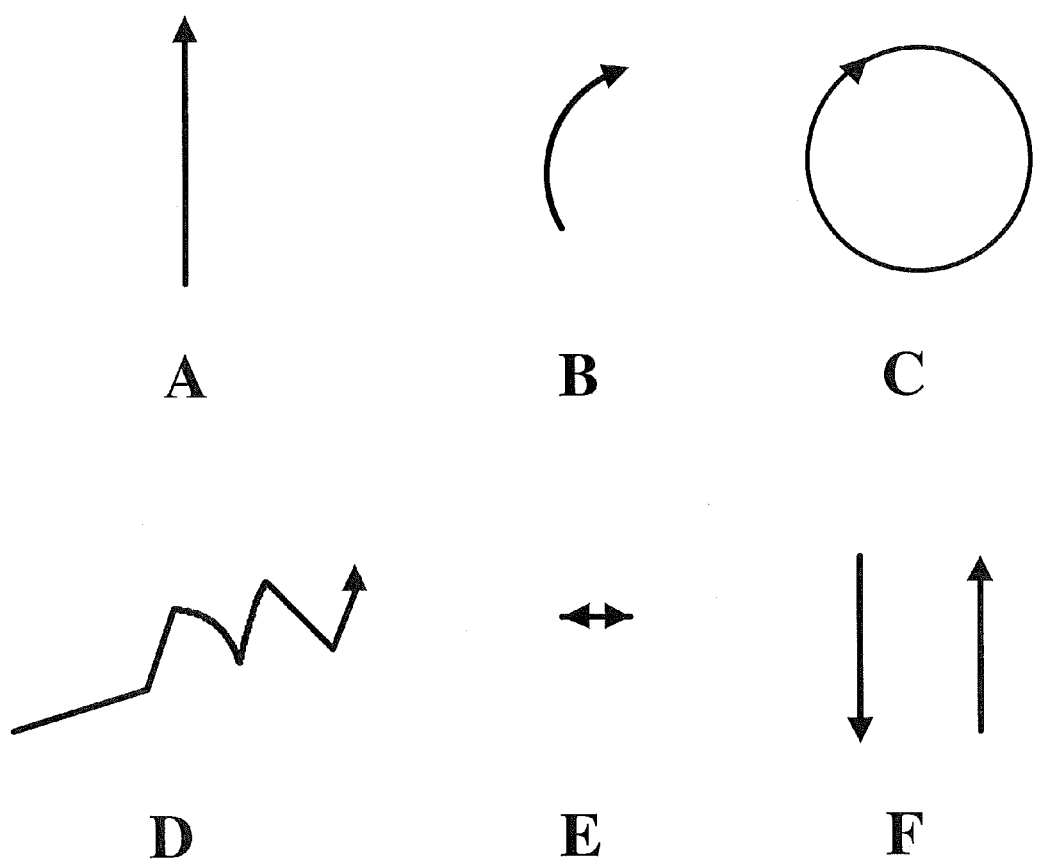
FIG. 1 Illustrative types of swipes.

Turning first to FIG. 1, we see a collection of illustrative swiping motions to which a swipe-switch might be made responsive. It should be noted that these motions are schematically represented in FIG. 1. In practice the motions would be performed typically by a human being, with some error and inaccuracy. Real-world embodiments of machines based on the present teachings would need to account for these errors and inaccuracies so that actual human swipes are effective to cause the desired response from the machine.

The first swipe is a simple linear swipe, shown in FIG. 1A. This swipe begins at some point, proceeds linearly in some direction, and ends. FIG. 1B is similar, but the path is curved in an open arc. FIG. 1C is also a curved path, but closed on itself. FIG. 1D is a zig-zag curve. FIG. 1E is a "pull apart" swipe made with two fingers or thumbs moving away from each other, or alternatively towards each other (not shown). FIG. 1F shows another two-finger swipe in which the fingers move alone parallel lines, opposite each other. These swipe gestures are evidently but a sample of the kinds of swipe gestures which might be distinguished from each other, given the appropriate hardware and software, and which might, therefore, form the basis of a swipe-switch.

There is an important asymmetry between swipe controls and switches. A single swipe control can be used to partially emulate a switch, but a single switch cannot be used to emulate a swipe control. For non-limiting example, a light could be set to be switched on and off in response to a swipe, such as the motion of a finger over a certain distance on a capacitive film, but a single switch cannot be used to control arbitrary continuous motion of a cursor across a screen.

Though a swipe control is generally more powerful and versatile than a switch, a switch has one important advantage over a swipe control, an aspect which cannot be emulated by a single swipe control. A switch can be used to enter a state and stay in that state for a user-selected amount of time. For instance, a switch can be set to turn on a light while pressed, keep it on as long as the switch is pressed, and to turn the light off when the switch is released. A switch such as the space bar on a keyboard can be set to enter a space symbol when it is pressed, and to keep on entering space symbols for as long as the space bar is held down. A swipe, by contrast, cannot be continued indefinitely. It happens for a typically brief amount of time, and then it is over.

We will call a swipe control which is used as a switch a swipe-switch. As just explained, a swipe-switch by itself is less powerful than either a swipe control or a regular switch. A swipe control is more complex than a switch, thus a swipe control is harder to make and use than a switch, but it has the advantage of being able to control a continuously variable quantity. On the other hand, a switch has an advantage over a swipe control in that it can set a single state for a user-controllable amount of time. Though it is as complex to implement as a swipe control, a simple swipe-switch is less powerful than either a swipe control or a switch, since unlike a swipe control, a simple swipe-switch cannot by itself control any continuously varying quantity, and unlike a switch, it cannot activate a state for a user-controllable amount of time. Therefore, to persons of average skill in the art, an easy-to-use swipe-switch is an oxymoron, making it perversely counter-intuitive for them to use a swipe-switch in any context in which a switch would be easy for an intended user to use, unless they intended to make the switch difficult to activate.

Swipe controls and swipe-switches respond to swipes. As will be discussed further below, swipes may be of various recognizable "types" depending on the shape of the path taken during the swipe. In general, an apparatus incorporating swipe-sensitive elements will comprise a swipe classifier capable of classifying an input into one of the available swipe types. The number of different types which can be recognized depends on properties of the hardware, and of the classifier. As will be discussed more fully below, a swipe classifier can be constructed to classify swipes not just by the shape of their path, but also by the location of the path. Thus, for instance, we could classify two linear paths in the same direction, but displaced from one another to be of the same type in terms of the shape of their path, but different in terms of their location.

The resolution of the classifier in both spatial displacement and in the space of path shapes is generally both hardware and software dependent.

An Illustrative Keyboard Comprising a Swipe-Switch

Figure 2:
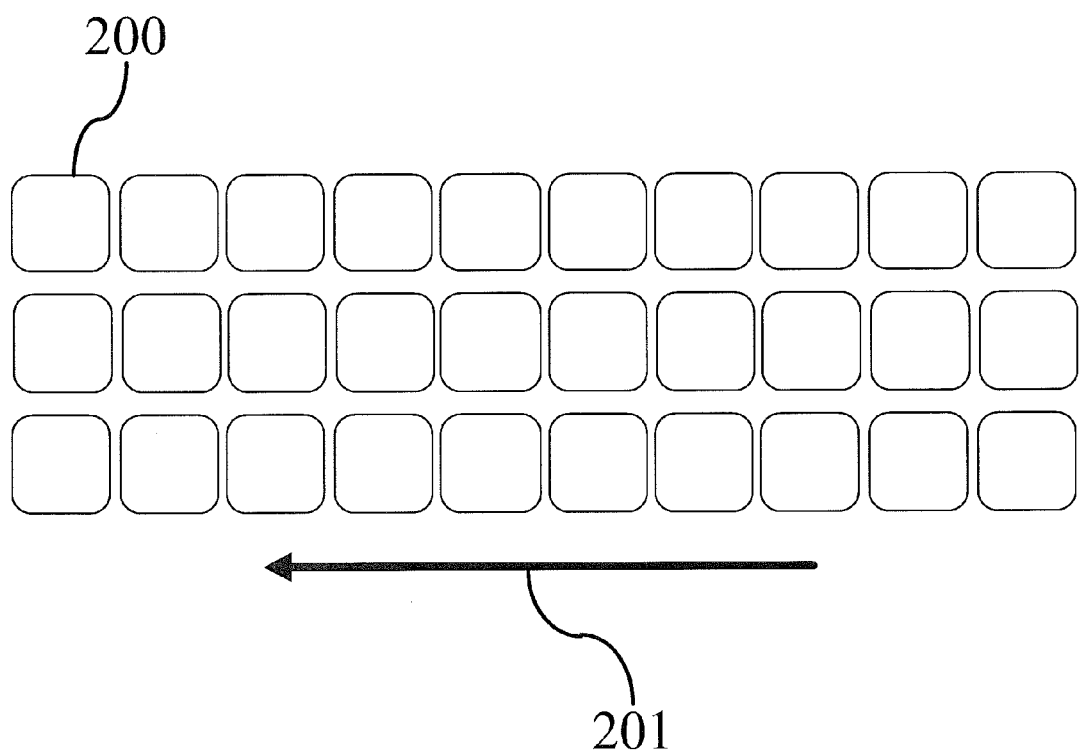
FIG. 2. An illustrative keyboard comprising a swipe-switch

Turning now to FIG. 2, we see an illustrative embodiment comprising a keyboard [200] in which the normal space bar is replaced by a swipe-switch [201]. The swipe-switch [201] performs in part the same action that the switch it replaces did, namely, to enter the space symbol. In this embodiment, the swipe-switch [201] is activated by swiping from right to left on or near the path indicated by the arrow. A space symbol is entered when such a swipe is detected. The other keys in the keyboard [200] in this illustrative non-limiting example perform exactly as they would in prior-art keyboard.

Pressing a space bar is easier than performing a swipe, and, furthermore, a normal space bar can be held down to enter an arbitrary number of consecutive space symbols, while the swipe-switch [201] cannot be "held down". It enters one space symbol per swipe. This embodiment thus shows that in at least some aspects illustrated by this embodiment, we disclose s a profoundly non-intuitive step backwards from the prior art in terms of functionality, a step which any person of average skill and good common sense would resolutely shun.

The actions of entering a symbol on a keyboard, or switching one or more keys on a keyboard from one state to another are prime non-limiting examples of contexts in which a switch would do and does completely do in the prior art. We will call actions typically performed by keys on a keyboard "keyboard actions". Inventively leaping beyond these commonsense notions about swipe-switches, rebelliously turning our back on the perfectly legitimate impulses which bar average right-thinking persons from contemplating in other than horror the use of swipe-switches in contexts where switches would do, we teach and enable apparatuses which bizarrely and extravagantly incorporate swipe-switches in a keyboard merely to perform commonplace keyboard actions, traditionally performed by switches. The result of this folly is both surprising and astounding. The power, flexibility, and industrial applicability of the keyboard can be increased not only incrementally, but explosively. For non-limiting example, as will be taught via various illustrative embodiments, keyboards comprising swipe-switches and relatively few keys may nonetheless incorporate all the functionality and more of traditional keyboards, or other traditional devices, in an entirely unexpectedly easy-to-use way. We will see that a keyboard could even be created in which all functions performed in traditional keyboards by traditional switches could be performed by swipe-switches, either acting alone or in combination with keys and/or other swipe-switches.

Figure 3:
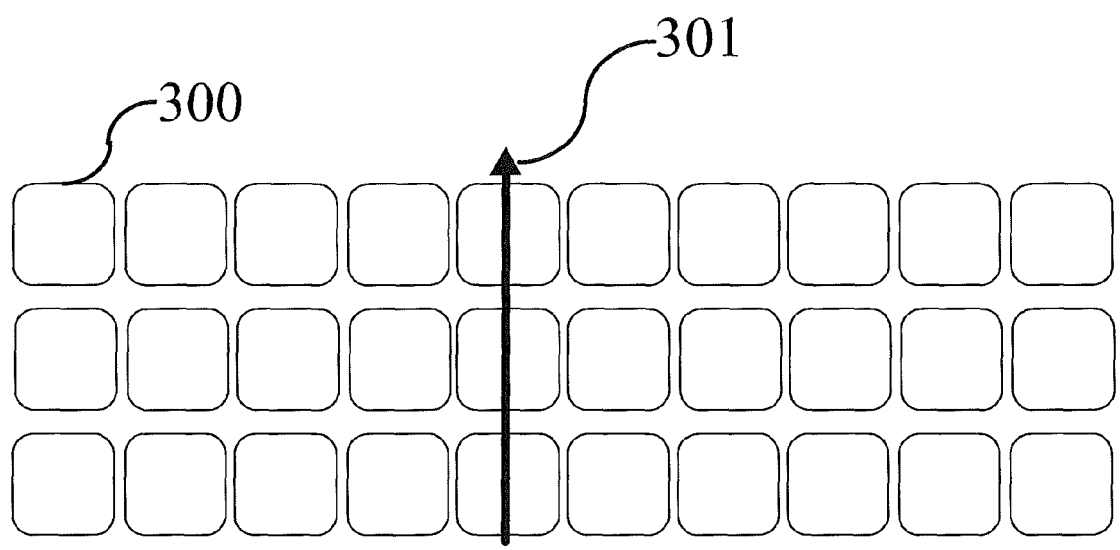
FIG. 3. An illustrative keyboard comprising a swipe-switch overlapping to the key area.

An Illustrative Keyboard Comprising a Swipe-Switch Overlapping to the Key Area Turning now to FIG. 3, we see an illustration of how, according to the teachings of this aspect hereby disclosed, the area of a keyboard comprising a swipe-switch can be reduced. In the illustrative embodiment of FIG. 3, the entire surface the keyboard [300] is sensitive to swipes in the upwards direction, as indicated by the arrow [301], as well as to downward presses or touches on the keys. Mechanically, this can be accomplished by a variety of means, such as fabricating the keyboard [300] from a touchpad or touchscreen. The keys might be mechanical switches, displacably responsive to downwards force on their surface, while the surfaces of the keys are themselves touchpads or touchscreens, responsive to swipes. If the swipe-switch is used to perform the action of entering a space symbol into text, and the keys in keyboard [300] perform in the same way as the keys in keyboard [200], then the embodiment of FIG. 3 performs the same functions as the embodiment of FIG. 2, but does so in a device of smaller area.

Figure 4:
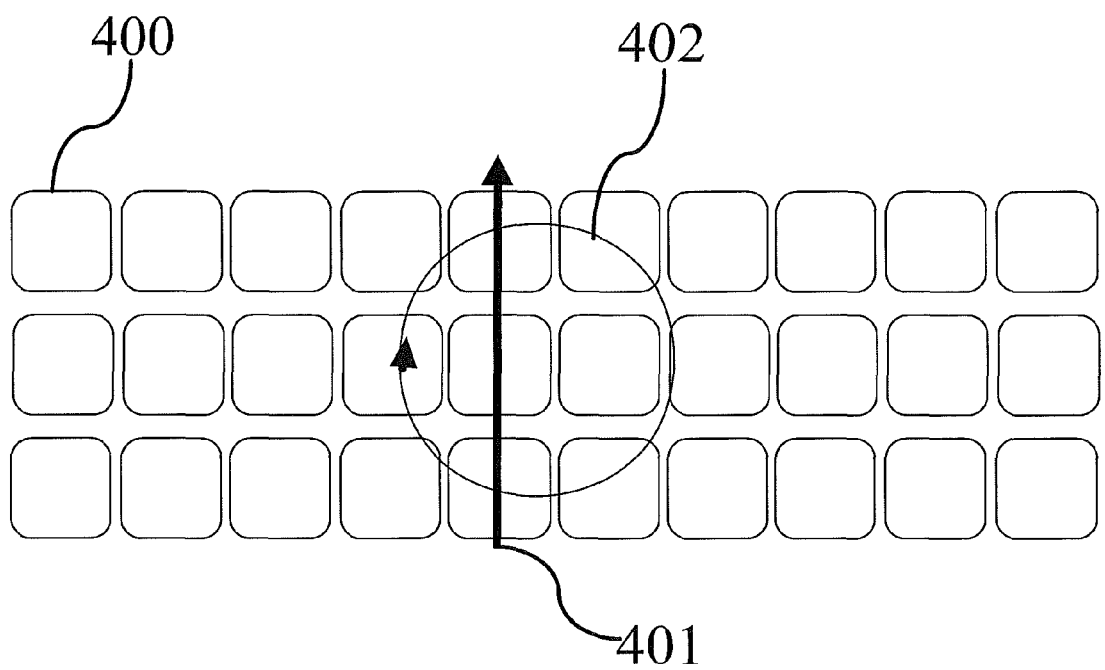
FIG. 4. An illustrative keyboard comprising two different types of swipe-switches overlapping the key area.

An Illustrative Keyboard Comprising Two Different Types of Swipe-Switches Overlapping the Key Area Turning now to FIG. 4, we see an illustrative embodiment comprising a keyboard [400] comprising two swipe-switches, each responsive to a different kind of swipe. The first swipe-switch is responsive to upwards swipes across the entire surface of the keyboard [400], as indicated by the arrow [401]. The second swipe-switch is responsive to closed circular swipes in a clockwise direction at any location on the entire surface of the keyboard, indicated by the closed circle [402]. These two swipe-switches [401-402] can be used to perform keyboard functions. For non-limiting example, the swipe [401] could be used to enter the space symbol, as in the embodiment of FIG. 3, and the swipe [402] could be used to change the action of the keys, for instance, from the entry of letters to the entry of digits. The embodiment of FIG. 4 could be built in the same physical substrata as the embodiment of FIG. 3, provided that the mechanism is capable of distinguishing the two types of swipes.

Figure 5:
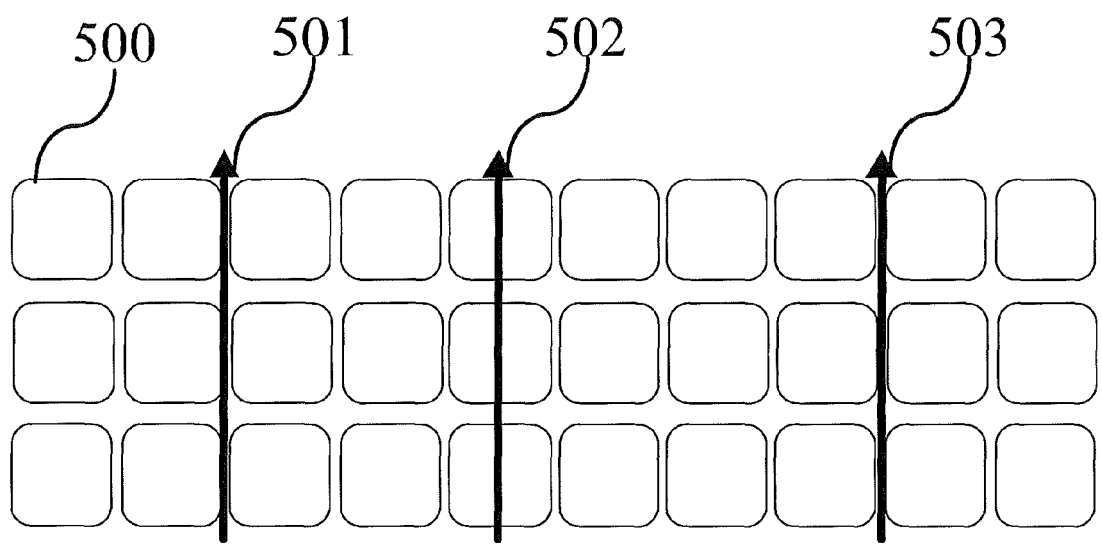
FIG. 5. An illustrative keyboard comprising a plurality of swipe-switches of the same type overlapping the key area.

An Illustrative Keyboard Comprising a Plurality of Swipe-Switches of the Same Type Overlapping the Key Area Turning now to FIG. 5, we see an illustrative embodiment comprising a keyboard [500] comprising three swipe-switches all of the same type, namely, all responsive to upwards swipes. The three swipe-switches are indicated by the arrows [501-503]. While in the previous embodiment of FIG. 4, an upward swipe anywhere on the keyboard activated the same swipe-switch, here in FIG. 5, we have a plurality of swipe swipes of the same type, distinguished from each other only by their location. Therefore, we endow the apparatus of FIG. 5 with an activation mechanism for associating an upward swipe with one of the swipe-switches, depending on the swipe path location. For non-limiting example, the activation mechanism could calculate the distance from the swipe path to each directed line representing the preferred location of each of the swipe-switches. These preferred locations indicated in FIG. 5 by the position of the arrows [501-503]. The activation mechanism would then activate whichever swipe-switch was closest to the swipe path. Other functions for matching a swipe path with a preferred location can be imagined. The details depend on the details of the mechanical and electrical substrate of the device. Given an activation mechanism, the three swipe-switches are available to represent keyboard functions traditionally performed by keys, such as entering specified symbols, or changing the function of the normal keys.

Figure 6:
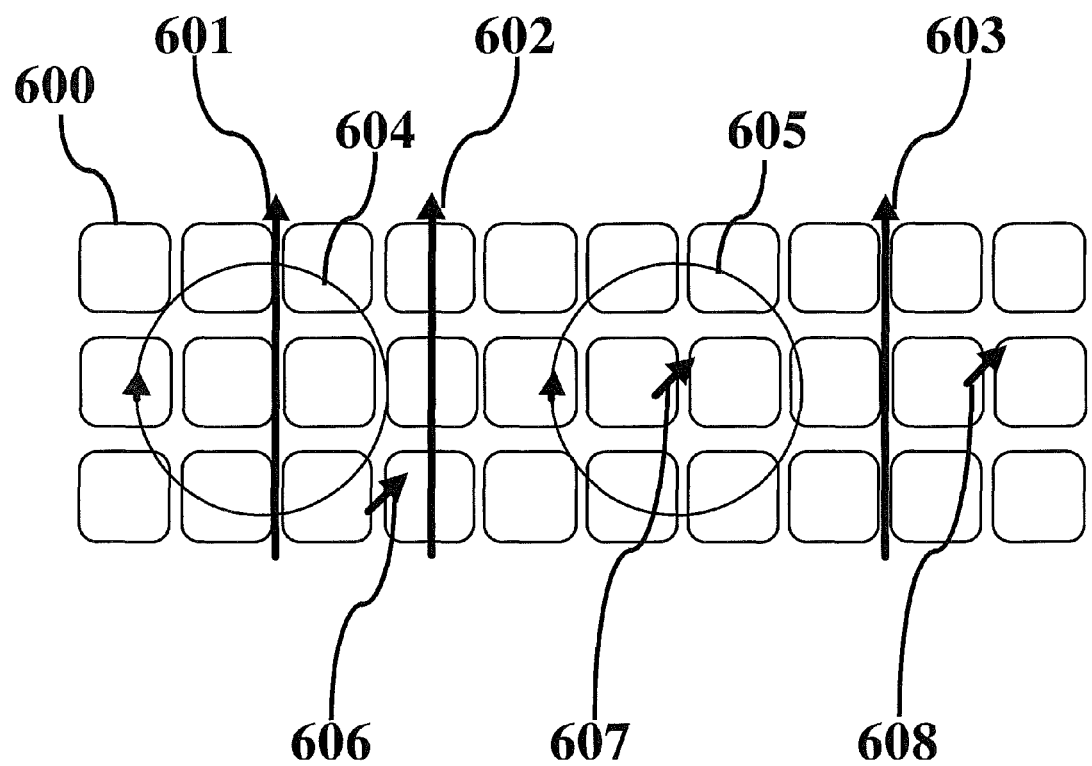
FIG. 6. An illustrative keyboard comprising several pluralities of swipe-switches of different types.

An Illustrative Keyboard Comprising Several Pluralities of Swipe-Switches of Different Types Turning now to FIG. 6, we see an illustrative embodiment comprising a keyboard [600] comprising swipe-switches of a plurality of different types, with a plurality of swipe-switches of a given type. In FIG. 6, there are, for illustration, three different types of swipe-switches, those responsive to upwards swipes indicated by the upwards arrows [601-603], those responsive to closed circular swipes [604-605], and those response to up-left swipes [606-608]. Since there are multiple types of swipe-switches and multiple instances of each type, the activation mechanism must both a) determine which type of swipe has been made, and b) determine which swipe-switch of the determined type was intended to be activated by the user. It is preferred that the determinations are made in that order, that is, first determine type, and then determine which of that type. In this illustrative non-limiting example, again, the swipe-switches are used to replace functions normally performed by keys (switches), for non-limiting example entry of symbols, or changing the symbol set input by the regular keys. It is to be noted that the number of types of swipes, and number of instances of swipe-switches of each type is limited only by the ability of the activation mechanism to make its determinations in normal use. These parameters (maximum number of types and maximum number of instances of each type) are a function of aspects of the physical substrate in which this embodiment is implemented, its overall size, sensitivity, computing power, and so on. With standard present-day technology, such as touchscreen technology, the total number of swipe-switches which can be reasonably implemented rivals or exceeds the number of standard keys which can be reasonably implemented in the same device. Especially since some of these swipe-switches can be used to change the function of the regular keys, the total number of symbols which can be input, or functions which can be performed with just a swipe and a keypress is many times greater than can be performed by just keypresses in a keyboard without swipe-switches.

Figure 7:
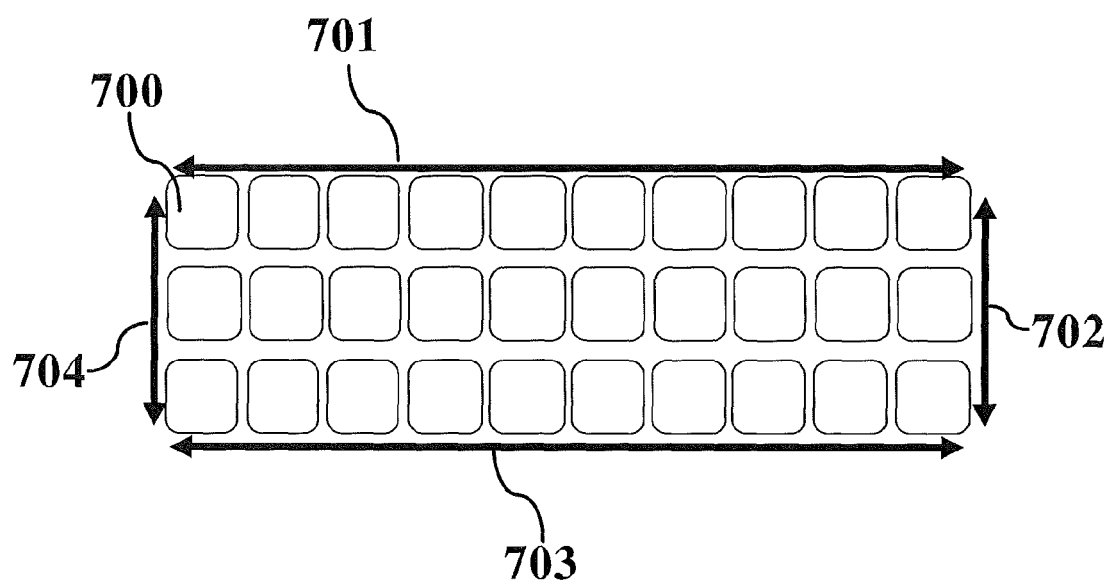
FIG. 7. An illustrative keyboard comprising swipe-switches at the border of the keyboard.

An Illustrative Keyboard Comprising Swipe-Switches at the Border of the Keyboard Turning now to FIG. 7, we point out that swipe-switches may be disposed on the border of a key array, or otherwise surround a plurality of keys. This disposition of swipe-switches may have the advantage of making the swipe-switches easier to find and operate. In the illustrative embodiment of FIG. 7, the keyboard [700] has bi-directional swipe-switches [701-704] on each of its borders. The bi-directional swipe-switches perform the same function whether they are swiped right-to-left or left-to-right in the case of horizontal swipe-switches [701] and [703], or up or down in the case of vertical swipe-switches [702] and [704]. Swipe-switches on the border of and in the same plane as a keyboard are easy to locate, and, in this illustrative non-limiting example, making the swipe-switches bi-directional makes it more likely that they can be activated easily and quickly independently of the immediately preceding gesture executed by the user. Border swipe-switches need not be in the same plane as the keyboard to which they pertain. For instance, a 3-dimensional device with several faces could have a keyboard on a first face, and swipe-switches along the faces adjacent to the first face, as shown in FIG. 7 where the arrows are considered to be on the adjacent faces.

Figure 8:
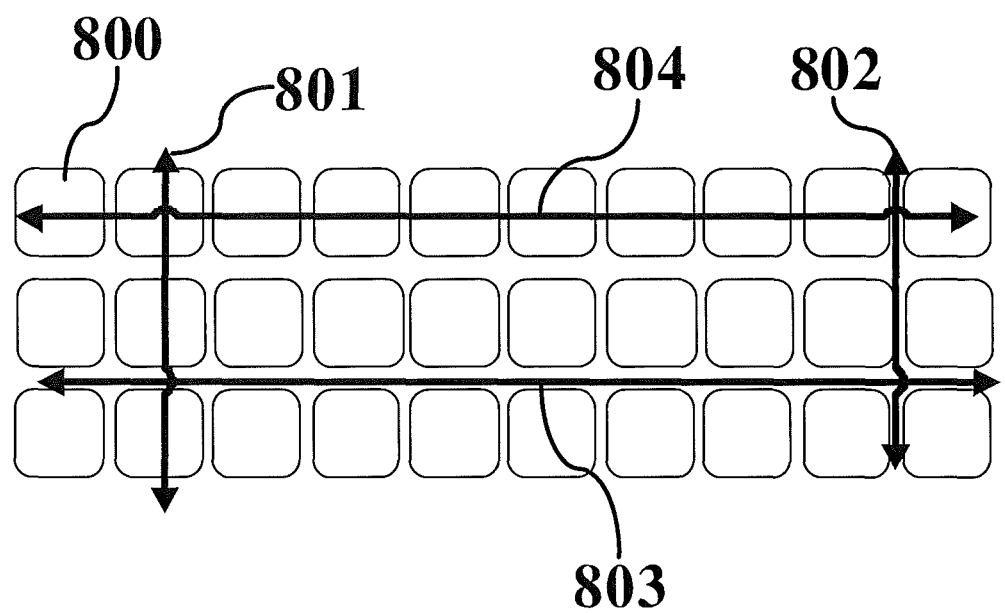
FIG. 8. An illustrative keyboard comprising swipe-switches between rows and columns of keys and within rows and columns of keys.

An Illustrative Keyboard Comprising Swipe-Switches Between Rows and Columns of Keys and within Rows and Columns of Keys Turning now to FIG. 8, an illustrative embodiment is proposed to particularly point out that when keys are arranged in a regular array of rows and columns, and swipe-switches incorporated into the array, these swipe-switches need not align with the array in any manner at all, or, if they do align with the array, they may do so either in phase or out of phase. That is, a linear swipe may have a preferred location between rows or columns, or within a row or column.

In FIG. 8, the keyboard [800] comprises four swipe-switches, two vertical [801-802] and two horizontal [803-804]. In this case, swipe-switches [801] and [804] are in phase in that their preferred locations align with a column or row respectively, while swipe-switches [802] and [803] are out of phase in the sense that their preferred swipe location is between columns or rows, respectively. As in the case of FIG. 7, placing the preferred location of a swipe in a easily recognizable position with respect to a key array may contribute to the usability of the device. While in the embodiment of FIG. 7, the easily recognizable locations was at the border of the key array, in the embodiment of FIG. 8, the easily recognizable locations are along rows or columns or between rows or columns. Clearly, the embodiments of FIG. 7. and FIG. 8. could be combined with swipe-switches both at borders and between or on rows and/or columns. Such an embodiment could further comprise swipe-switches with no particular geometric relationship with the key array.

An Illustrative Keyboard Comprising Multiple Swipe-Switches Used in Conjunction In the embodiments described up to now, we have concentrated on describing the use of swipe-switches in isolation, one at a time. However, swipe-switches may be used in combination, activated simultaneously or sequentially to represent actions distinct from the actions represented from the actions associated with each swipe-switch individually. When swipe-switches are combined in this way, the number of actions they can perform increases exponentially.

Figure 9:
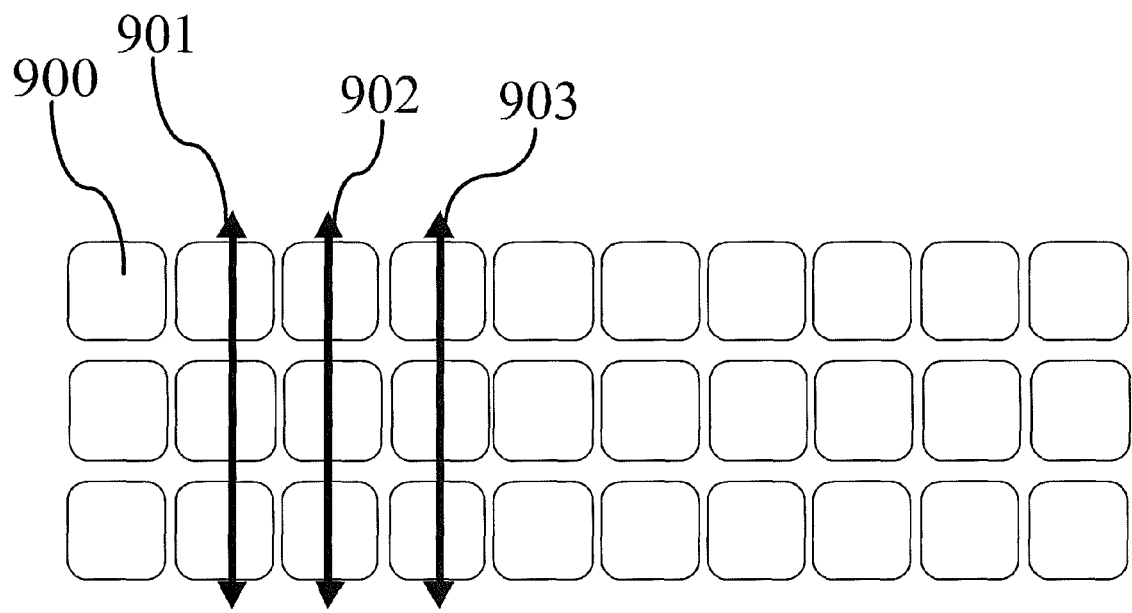
FIG. 9. An illustrative keyboard comprising multiple swipe-switches used in conjunction with each other.

Turning now to FIG. 9, we see a keyboard [900] comprising three swipe-switches with parallel preferred locations [901-903]. Each of these swipe-switches performs a function when swiped individually. We will call these functions $F_1$, $F_2$, $F_3$ respectively for [901-903]. When they are combined by being simultaneously swiped, they give access to a number of new functions, namely, $F_{12}$, $F_{13}$, $F_{23}$ and $F_{123}$. If any of the swipe-switches are used to change the state of the keyboard, and/or other swipe-switches, then the number of accessible new functions increases still further, as the swipes can be used not only simultaneously, but sequentially. For instance, the result of swiping along [901] might be to change the function $F_2$ of swipe-switch to function $F_2'$. In effect, sequential use of swipe-switches exchanges more user manipulation for fewer swipe-switches (and/or keys). While it is generally desirable to require as few user manipulations for a given function as possible, it may also be desirable to limit the number of swipe-switches and/or keys due to size or swipe resolution constraints. Many such combinations are discussed in the various embodiments detailed in this disclosure to illustrate the breadth of apparatuses and methods taught herein.

An Illustrative Keyboard Comprising a Swipe-Switch-Hold Control

Figure 10:
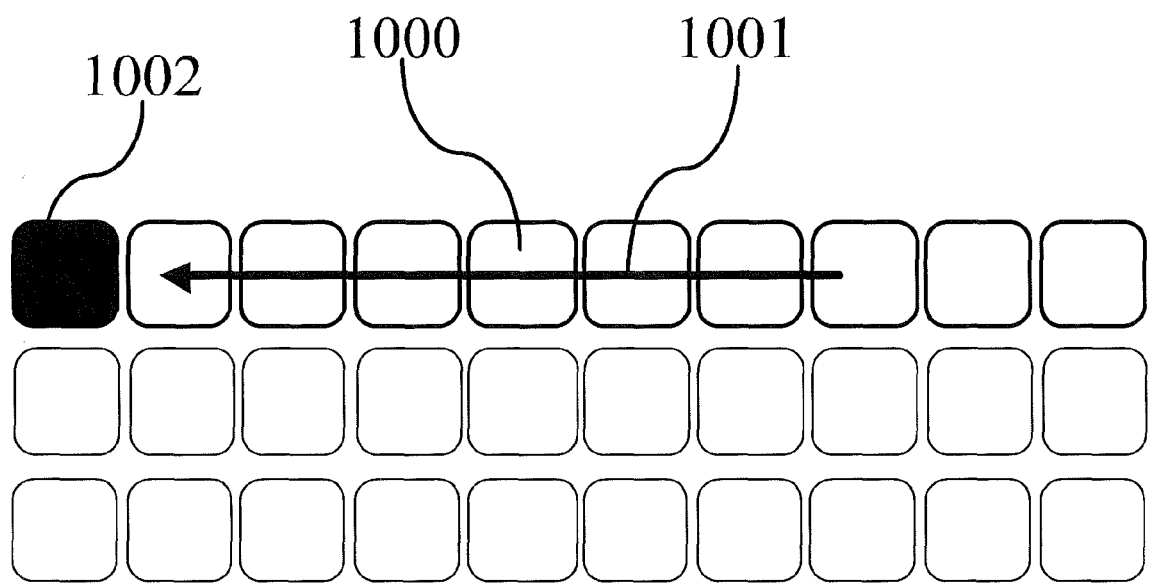
FIG. 10. An illustrative keyboard comprising a swipe-switch-hold control.

We have pointed out that a switch has an advantage over a swipe-switch in that a switch can be used to set a state for a user-controllable amount of time, while a basic swipe-switch cannot. The embodiment of FIG. 10 shows that this advantage of switches over swipe-switches can be recovered using a class of swipe-switches which we will call swipe-switch-hold controls. A swipe-switch-hold control comprises a swipe-switch and a switch, where the function of the switch is to continue (hold) any action or state initiated by the swipe-switch. In many instances, the holding is preferably accomplished as part of the same gesture as the swiping, thus it is advantageous to locate the hold switch such that it can be activated in a physical continuation of the swipe gesture. When a single finger or thumb is used to perform the swipe, for instance, it is preferable to place the hold switch in the same area, or an adjacent area as the area in which the swipe-switch is activated. If two fingers are used to perform the swipe-switch-hold, the swipe can be performed by one finger and the hold by another, so that the swipe area and the hold area need not be contiguous or overlapping.

A non-limiting example of swipe-switch-hold designed to be used by a single finger is shown in FIG. 10. Here, the keyboard [1000] comprises a swipe-switch, indicated by [1001] and a hold switch [1002], where [1001] and [1002] taken together comprise a swipe-switch-hold control. The purpose of the hold-switch [1002] is to continue the action of the most-recent activation of the swipe-switch [1001]. The swipe-switch [1001] and the hold-switch [1002] are arranged so that a single gesture can activate both: a swipe, e.g. along the top row of keys of [1000], activates the swipe-switch [1001] and then continues and comes to rest on the hold-switch [1002]. As long as the finger rests on [1002], the action initiated by the swipe will continue. When the hold is released, the action stops. The actions of starting an action and continuing the action have been, remarkably, separated in space. The swipe-switch-hold of FIG. 10 could be used to perform any keyboard action, such as changing the function of the keyboard [1000] from use for entered letter to use for entering digits.

It is to be noted that the hold-switch [1002] need not be limited to only serving as the hold portion of the swipe-switch-hold. It could also perform other keyboard functions, such as entering a symbol, when the swipe-switch [1001] has not been activated in the immediate previous. It is also to be noted that the region sensitive to swipes and the region sensitive to holding could overlap, though they are not identical. While in a normal switch the activation region and the hold region are necessarily identical, this is not the case for a swipe-switch-hold.

An Illustrative Keyboard Comprising Swipe-Switches which Emulates a Full Desktop Keyboard It may already be clear from the foregoing embodiments that a keyboard comprising swipe-switches may be made at least as versatile and powerful as a traditional desktop keyboard, though with fewer keys, and thus, for equal key size, occupying less space. To further illustrate this point, we now discuss a keyboard performing all of the most commonly used functions of a common desktop Qwerty keyboard for the Latin script. It is to be noted that while we may, for the sake of clarity, make remarks in this disclosure in reference to the Latin script, nothing is meant to limit to the Latin script. Similarly, conventional or unconventional typewriter keyboards other than Qwerty, and/or for scripts other than Latin, or even unconventional keyboards for arbitrary symbol sets, when combined with swipe-switches performing keyboard actions, are within the scope of this disclosure. Along the way of describing this present embodiment, we will point out and particularly describe some additional novel features and aspects.

A typical desktop keyboard has a variety of meta keys which, when combined with keys for entering letters and/or digits, cause the input of less common symbols or cause various actions. These meta keys, depending on the manufacturer, operating system, and/or computer program, may be called by various names such as "meta" "escape" "alt" "apple" "windows" "function" "control" "shift" and so on. For instance, in the Microsoft Windows operating system, the key sequence control-c is used to copy selected text to a clipboard, and control-v is used to paste the clipboard text into a selected text. Meta keys are often used in combination to perform still more functions. For instance, control-alt-delete may cause the reboot of a computer running Microsoft Windows.

The typical desktop keyboard also has a variety of locks, such as Caps-lock and Num-lock, which toggle a change in the function of the other keys. For instance, when Caps-lock is set, uppercase rather than lowercase letters are entered by the letter keys.

The typical desktop keyboard may also contain auxiliary arrays of still other keys, performing functions such as page-up and page-down, or user-programmable function keys, or keys to launch specific programs, and so on.

Figure 11:
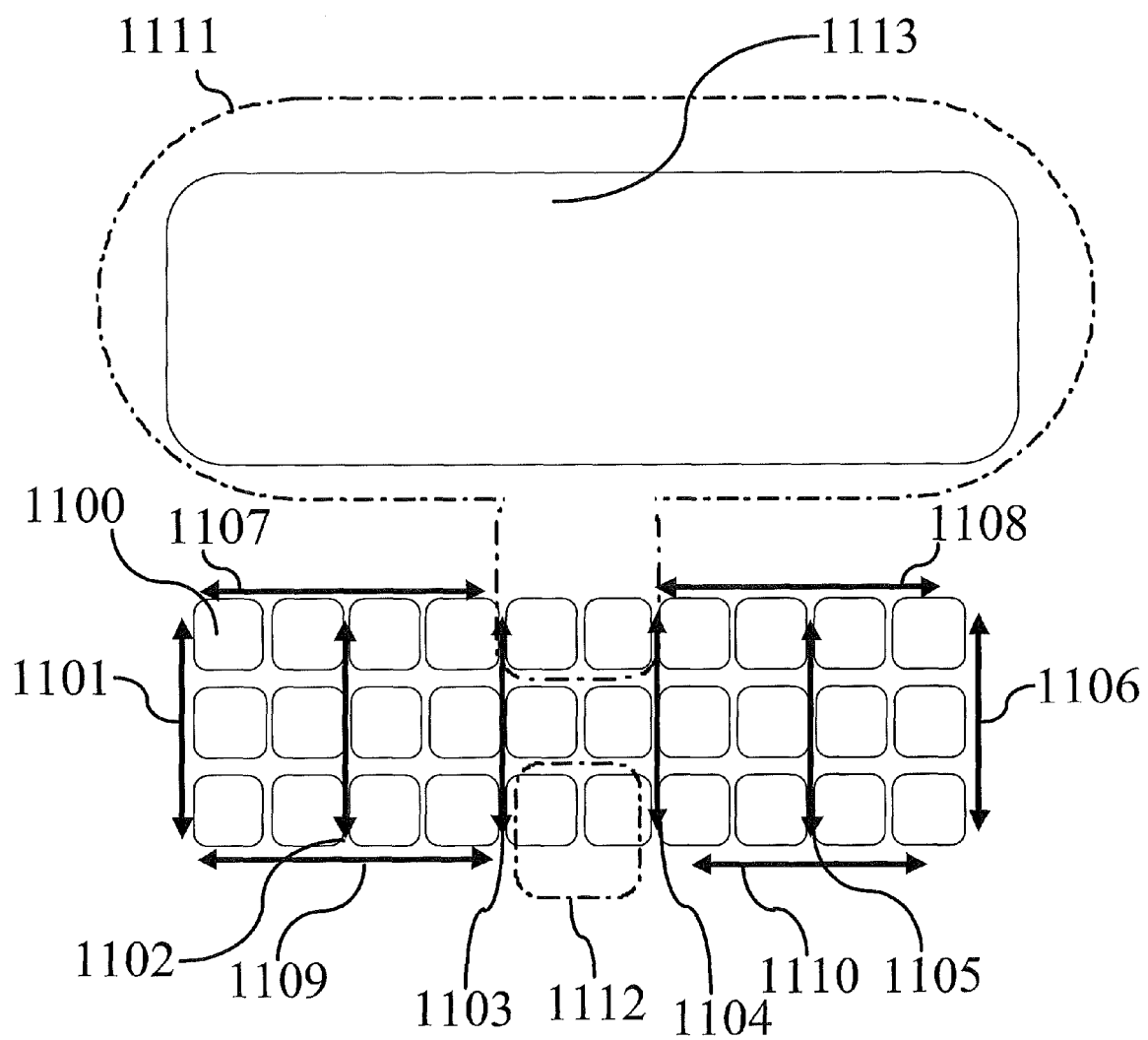
FIG. 11. An illustrative keyboard comprising swipe-switches that emulates a full desktop keyboard.

Turning now to FIG. 11, we illustrate how all of this traditional keyboard behavior can be captured in a compact keyboard comprising swipe-switches. The keyboard [1100] of FIG. 11 comprises an array of linear, vertically oriented swipe-switches [1101-1106] regularly spaced with two columns of keys between them, another array of horizontal swipe-switches [1107-1110], two hold areas [1111-1112] for forming swipe-switch-hold controls, and a touch-sensitive text display [1113]. Note that for clarity of illustration, the display [1113] is shown schematically as separated by some distance from the keyboard [1100]. Since, as we will see more clearly below, the display [1113] is meant to be used as the hold area for various swipe-switch-hold controls, it is best placed near to the keyboard [1100] so that swipes begun on the keyboard can continue smoothly into the hold area [1111] comprising the display [1113].

Given all these elements, we can assign keyboard functions to keys, swipe-switches, and holds in various ways. An illustrative assignment is now briefly described.

Regular Keys

As for the regular keys, a Qwerty keyboard occupies 10 columns and 3 rows of keys. If we are to embed the Qwerty keyboard in a full, regular array of keys, we need 30 keys, as shown at [1100]. Since there are only 26 letters in the Qwerty arrangement, some of these keys can be used for other functions and symbol entry, such as carriage return, entry of punctuation symbols such as period, comma, and apostrophe. Similar remarks pertain to typewriter layouts other than Qwerty, e.g. for other scripts and languages.

Lockable and Holdable Meta Keys

The four horizontal swipe-switches [1107-1110] will be used as lockable and holdable meta keys. A lockable and holdable meta key performs some meta function, such as "control", and can be either locked or held depending on the direction of the swipe. In this case, swipe-switches [1107-1108] are associated to the hold area [1111] and the swipe-switches [1109-1110] are associated to the hold area [1112]. When any of the swipe-switches [1107-1110] are swiped towards the center of the keyboard along their preferred path and then held, they act as swipe-switch-hold controls for the corresponding meta-function. When they are swiped away from the center of the keyboard along their preferred path, the corresponding meta-function is locked. Locks can be accumulated by locking more than one meta-function simultaneously or in sequence. Swiping any lock a second time unlocks it, and all other currently locked meta-functions.

It is evident that using this method any meta key and any lock key or any combination thereto found on a traditional keyboard can be emulated. For instance, if one of the horizontal-swipe-switches, for instance [1107] is used as a capitalization shift, it could function in the following way: a) swipe along the preferred path toward the center of the keyboard (to the right) without holding: capitalize next letter only, b) swipe along the preferred path toward the center and hold: capitalize all letters until hold is released, c) swipe along the preferred path away from the center of the keyboard (to the left): Caps-lock, d) swipe in either direction when Cap-lock is active: unlock Caps.

EOS Lock

Instead of c), it may be preferable to use a novel temporary lock which we will call EOS-lock ("End Of Set"-lock). The EOS lock is applicable not just to capitalization lock, but any mode-changing lock (such as a digit mode, punctuation mode, function mode, etc) in which symbols are entered in the mode. To make an EOS-lock, we define a set of mode symbols, and a disjoint set of end-of-mode symbols. Whenever an end-of-mode symbol is entered, then the lock is terminated. For instance, in the case of capitalization of words in English, we may define the set of mode symbols to be any letter a-z plus apostrophe. Anything else, such as a digit or punctuation symbol other than apostrophe is an end-of-mode symbol. When an EOS-lock is set, it will remain set when mode symbols are entered, and end when an end-of-mode symbol is entered. So, here, we can set the capitalization EOS-lock just defined and capitalize a sequence of mode symbols such as FRED'S. If we then enter a space (an EOS-symbol) then the EOS cap-lock will be released.

In another non-limiting illustrative example of EOS-locks, consider a telephone number entry mode, which we may assign for non-limiting example to [1108] where the digits 0-1 and the punctuation symbols left parenthesis, right parenthesis, hyphen, plus, and space are taken to be in the mode-symbol set, and anything else is in the EOS symbol set. Then we can set the telephone number mode lock and enter formatted telephone numbers such as +1 (313) 555-1212 without leaving the mode. When an EOS symbol is entered, such as a letter, then the telephone number mode is exited.

EOS-Hold

The EOS-hold is another novel swipe-switch keyboard function herein disclosed. An EOS-hold state begins when a swipe-switch-hold function is activated, and ends when both a) the hold has been released, and b) a symbol from the EOS symbol has been entered. The EOS-hold is useful in any situation where mode symbols normally occur in groups, and we wish for the mode change to apply to complete groups, rather than just individual in-mode symbols or sub-groups of in-mode symbols. A non-limiting example of symbols which normally occur in groups is written English, in which letters (together with apostrophe) normally occur in words.

Imagine, for instance, that we have a dictionary of user-defined words, and a user-dictionary mode. We may use the swipe-switch [1109] for non-limiting example, to enter this user-dictionary mode. When users enter user-dictionary mode by swiping [1109] toward the center of the keyboard and holding in the hold area [1112] they do so because they wish to enter one or more words into the user dictionary. Our EOS-hold is designed to allow any number of words to be entered into the user dictionary from a single swipe and hold, and yet, be sure that only complete words are entered into the user dictionary. Thus, if at some point in entering the sequence of words intended for the user dictionary, the user releases the hold, perhaps in the middle of a word, the system will remain in user-dictionary mode until an entire word is entered, signaled by the input of an EOS symbol. It is to be noted that [1109] could be both an EOS-lock and an EOS-hold.

When swiped toward the center and held, it is an EOS-hold, and when swiped away from the center it is an EOS-lock. In the EOS-lock mode it is used to enter a single word into the user dictionary, while in the EOS-hold mode it is used to enter one or more words into the user dictionary. Clearly, when more than one word is entered in EOS-hold, perhaps with EOS symbols interspersed while holding, then some mechanism must be provided to parse the words from the sequence of symbols entered while the EOS-hold state is active.

Digits/Punctuation/Function and Other Mode Changes and Symbol Entry

Up to now, the vertical swipe-switches [1101-1106] of FIG. 11 have not been assigned functions. These are available to create modes to handle other functions typically performed by full desktop keyboards, such as entry of digits (not necessarily part of a telephone number), punctuation, letters in non-Latin scripts, page-up and page-down, user-assigned functions and so on. They may also be used to enter common symbols directly, without passing to an alternate mode. Note that all of the vertical swipe-switches are adjacent to the hold area [1111], so they may be used as components of a swipe-switch-hold control, if desired.

As a non-limiting example of symbol entry, consider using one of the vertical swipe-switches, for instance [1101] for the backspace function. We may, for instance, use a swipe downward on [1101] to perform the function "erase word", swipe upwards to perform the function "erase character" and swipe up and hold in hold area [1111] to perform the function "erase characters regularly until hold is released". Similarly, we make use other of the vertical swipe-switches to enter punctuation symbols which are often repeated successively, such as period (full stop). Using [1102] for the function, for instance, we may have that a swipe up without holding enters a full stop, while swiping up and holding in [1111] enters a sequence of full stops . . . stopping only when the hold is released.

The remaining vertical swipe-switches [1103-1106] might, for non-limiting example be used for function, number, punctuation, and Greek script entry, respectively.

An Illustrative Keyboard Comprising Swipe-Switches and an Ambiguous Keyboard We have repeatedly remarked that swipe-switches may be used to reduce the number of regular keys in a keyboard, by taking on the functions of the removed keys. Another way of reducing the number of keys is the use of ambiguous codes, such as is disclosed in U.S. Pat. No. 6,885,317, entitled "Touch-typable devices based on ambiguous codes and methods to design such devices" to Gutowitz, and US provisional application 60/844,592 entitled "Keypads row similar to a telephone keypad", and PCT application PCT/US05/14211 entitled "Typability optimized ambiguous keyboards with reduced distortion" all hereby incorporated by reference in their entirety The present embodiment will illustrate that these two methods of reducing the number of keys, swipe-switches and ambiguous codes, may be synergistically combined to produce very small but very powerful keyboards, suitable for doing convenient, high-quality text entry even in a small handheld device or micro laptop.

Figure 12:
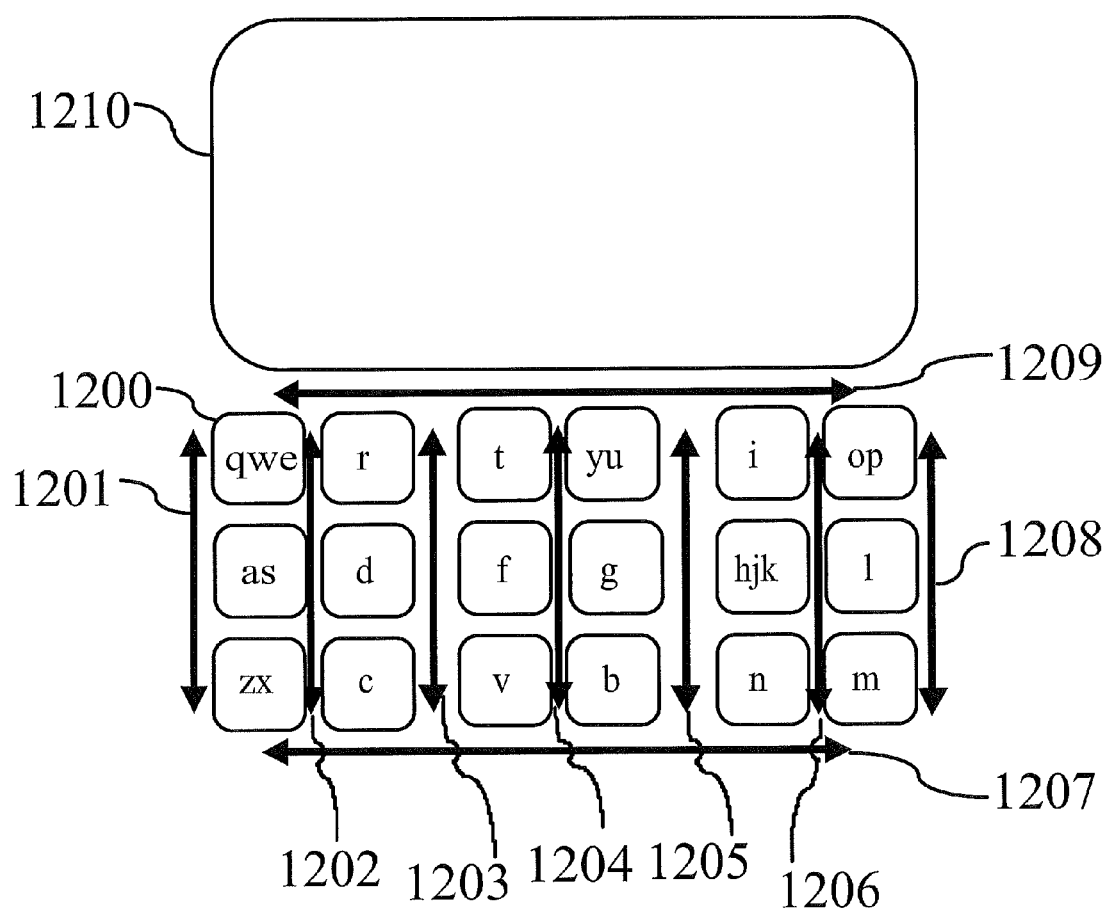
FIG. 12. An illustrative keyboard comprising swipe-switches and an ambiguous keyboard.

Turning now to FIG. 12, we see an illustrative keyboard ambiguous keyboard [1200] comprising swipe-switches performing a variety of keyboard actions. The keyboard [1200] comprises vertical linear swipe-switches at the borders [1201] and [1208] as well as additional vertical swipe-switches between each of the columns [1202-1206]. It has, in additional, two horizontal linear swipe-switches [1207] and [1209]. The device incorporates as well a display [1210], which may also be used as a hold area for all of the vertical linear swipe-switches, as well as for text display purposes. It should be noted that a swipe could also be along a given row or column, with a potentially different assignment of function or symbol than a swipe between rows or columns.

The ambiguous keyboard labeling of [1200] is an illustrative reduced-qwerty keyboard, where each key press may represent more than one letter. For non-limiting example, the key in the upper-right corner may input any of the letters q, w, or e when pressed once. Which letter is meant may be determined from context, as will be described in more detail below, and is fully described in the patent documents incorporated by reference herein. This present teachings are not limited to Qwerty, Latin script, non-alphabetic or alphabetic order layouts, 6 columns and/or 3 rows of keys, and generally can be applied much more widely than the specifics illustrated in this didactic embodiment.

An aspect of the key arrangement in FIG. 12 is worth noting: the keys are organized in groups of two columns each, with a relatively larger space between the groups than between the columns within a group. As taught more completely in U.S. provisional application 60/844,592 entitled "Keypads row similar to a telephone keypad" which has been incorporated by reference in its entirety, this provides "negative space" around each of the keys which is shared by keys bordering the negative space, increasing their effective target size. Accordingly, this aspect also provides more flexibility in the mechanical implementation of swipe-switches. The larger between-column space may aid in the use of technologies for swipe-sensitivity that are difficult to use when the keys are very close to each other or abutting. For instance, traditional keys with switches based on domes could be more readily used in conjunction with traditional touchpad technology between the column-groups, allowing swipe-switches and keys to be made contiguous in a low-cost way.

Function Assignments

We will now present an illustrative assignment of keyboard functions to the various swipe-switches to show how this reduced keypad, with only 18 regular keys, can perform many of the functions of a desktop keyboard with a full complement of keys.

As has been illustrated, and will continue to be illustrated, we can make a large number of alternate symbol layouts for any keyboard using swipe-switches, swipe-switches in combination with each other and/or in combination with regular keys. A swipe-switch may be used not only to change the mode of regular keys, but also of other swipe-switches, increasing their power. We will in this embodiment use the left-most vertical swipe-switch [1201] to manage the digit layout. Since there are 18 keys and only ten digits 0-9, we can assign all the digits and still have 8 keys left for other symbols and functions. We will use these keys for symbols related to numbers and operations on numbers, such as currency symbols, arithmetic functions, (e.g. +−=^), the number infinity (∞), and the "digits" of the standard telephone keypad, # and *. Thus, this digit mode can be used to enter phone numbers and do rudimentary calculations, as well as address the common use of entering quantities of money. We many add even more than 18 symbols to digit mode by placing more than one symbol on some of the keys in digit mode, and using some disambiguation mechanism, as described more fully below, to disambiguate them.

It will be beneficial to use swipe down on [1201] as an EOS-lock and swipe up on [1201] and hold in the display [1210] as an EOS-hold. A swipe up without holding on [1201] will enter a single symbol from digit mode. Any symbol which can be entered by a regular key in digit mode will be in the symbol set. We also chose to include in the defining symbol set for the EOS-hold and EOS-lock any individual symbol which is entered directly (without changing mode) via another swipe-switch, for any taping or swiping action in the display area [1210]. Any other keyboard action will be in the EOS set. This illustrates how EOS sets can be build up flexibly to allow EOS locks and holds to operate effectively, even in the context of other, perhaps complicated, swipe-switch actions. The usefulness of the particular assignment to the symbol set for digit mode will become apparent below. It is to be noted that the symbol sets for EOS-hold and EOS-lock could be distinct, even for the same swipe-switch.

Punctuation Modes

First Punctuation Mode

We have already made some punctuation symbols available by assigning them to digit mode. We can also use basic letter mode by assigning letter-like punctuation, such as apostrophe for English or middle dot for Catalan, to keys in letter mode, ambiguously with letters, or not. We can, and will below, assign punctuation symbols to be entered directly via swipe-switches, that is, without passing to another keyboard layout. Still, even with all these other methods for entering punctuation symbols, it may be beneficial to make a mode just for the entry of punctuation symbols. Especially given the possibility of entering multiple punctuation symbols on a single key, the 18 keys of the present embodiment are sufficient to enter a large number of common punctuation symbols in a first punctuation mode, such as slash, back-slash, parenthesis, colon. We will use switch-switch [1208] for entering the first punctuation mode, and define its actions similarly to the digit-mode switch [1201] described above. It will be defined as an EOS-hold when swiped upwards, and an EOS-lock when swiped upwards. Again, we will include in the symbol set any symbol entered directly by another swipe-switch, and any tapping or swiping motion in the display area [1210].

Second Punctuation Mode

While we have already accounted for all punctuation symbols and more which can be directly entered from a standard desktop keyboard, we can use the power and flexibility of various aspects hereby disclosed, alone and/or in combination, to expand the easily enterable set of symbols quite dramatically. Indeed, for the purposes of second and higher punctuation modes, we will take the definition of "punctuation" quite broadly to mean any Unicode codepoint. This includes, e.g. letters from other scripts, Unihan ideograms, dingbats and so on. The set of symbols enterable in second and higher punctuation modes could be configurable according to the current application. E.g. a messaging application may include the codepoint U+263A WHITE SMILING FACE, while a program for playing chess might include chess symbols such as U+265A BLACK CHESS KING. In this embodiment, we will enter second punctuation mode by a combination of swipe-switches. As long as we are in digit mode, entered using [1201], a swipe on [1208] will enter second punctuation mode. In other words, while alphabetic mode is the "launch point" for digit mode and the first punctuation mode, digit mode is the launch point for second punctuation mode. The behavior of the swipe entering second punctuation mode can be defined similarly to the swipes entering digit mode or first punctuation mode. That is, down could be swipe-lock, up swipe-hold, etc. It should be appreciated that by using other combinations of swipe-switches and/or combinations of swipe-switches with keys, still further "punctuation" modes could be created similarly and without limitation to that which was just described.

Capitalization

Given the above teachings, it should be appreciated that capitalization can be handled in this embodiment in much the same way as entry of digits and punctuation. We will use swipe-switch [1206] for the purpose of capitalization, with swipe down being EOS-lock and swipe up being a regular swipe-switch-hold. A swipe up without holding capitalizes just the next entered letter, if entered immediately before any other mode change. The symbol set and EOS set are defined as described above in reference to FIG. 11.

Direct Symbol Entry Using Swipe-Switches

In some cases, it is advantageous to enter symbols using a swipe-switch directly, that is, not by using the swipe-switch as an intermediary to change the mode of a regular key or keys. A non-limiting example use is for entry of a symbol which is generally useful regardless of which mode the keys are in. For the purposes of the present embodiment, these generally useful symbols are space, backspace, period, comma, exclamation point and question mark. We will arrange it, in particular, such that each of backspace, exclamation point and question mark can not only be entered directly by a swipe-switch, but an arbitrary number of repeats of these symbols can be entered by the corresponding swipe-switch-hold. More specifically, we will set swipe down on [1203] to enter comma, swipe up on [1203] to enter exclamation point. Swiping up on [1203] and holding in [1210] will continue to enter exclamation points, at say 100 ms intervals, for as long as the hold is maintained. Similarly, [1204] enters space on a down swipe and backspace on an up swipe, and repeats of backspace at regular intervals on swipe up and hold in [1210]. Finally, [1205] enters period (full stop) on swipe down and question mark on swipe up, with repeats at regular intervals as long as a hold is maintained in [1210].

Meta Keys, Singly or in Combination, Possibly Software Configurable

We have already discussed the use of meta keys in regular desktop keyboards and pointed out that meta key functions can be performed by swipe-switches. In the present embodiment, we will use the horizontal swipe-switches [1207] and [1209] for meta-key functions. We have pointed out that the names and assignments of meta-key functions may be software configurable, and that meta keys may be used in combination to obtain more meta modes than could be obtained only using meta keys individually. All of these remarks pertain to the present embodiment as well. Since this embodiment includes an ambiguous keyboard, an additional factor is to be considered: a meta-key+regular key combination may represent more than one function, and a mechanism could be provided to resolve these ambiguities, if any. These ambiguities could, furthermore, be letter layout dependent, and the letter layout itself could change depending on mode. For instance, a meta key may change the layout from a reduced Qwerty layout to a reduced Dvorak layout or a reduced alphabetic layout, and in each of these cases the set of ambiguities will be different. Even fixing a Qwerty layout, the number of columns used in the reduced Qwerty layout could vary as a function of the operation of meta keys, and the resulting set of ambiguities will change.

For concreteness, let us assume that in some software application and/or operating system, left swipe on [1209] is the meta function "control", right swipe on [1209] is the meta function "alt", left swipe on [1207] is "function" and right swipe on [1207] is "escape". The software may define "control-q" to mean "quit", "control-w" to mean "write", and "control-e" to mean "edit". In this case, when the user swipes left on [1209] and presses the "qwe" key, the system does not know, without more, whether the user intended to quit, write, or edit. Some disambiguation mechanism is needed, and we will use tap on the display [1210] to mean "Next". After swipe left on [1209] and then press of the "qwe" key, one of the various functions will be selected. If the user means a different function, they may continually tap on [1210] until their desired function is selected. The functions could be presented in the same order as the letters on the key, namely, q,w,e, or in alphabetic order, or in order of descending probability calculated from context, or simply an arbitrary order. The Next function could also be implemented by pressing the same "qwe" key repeated until the desired function is obtained, or by still some other method. Using these methods, even software which depends very heavily on the use of meta keys, such as Emacs, can be operated easily and without loss of functionality with a keyboard built according to these teachings.

We have noted that ambiguous keyboards, in which a given sequence of keyboard actions may correspond to multiple symbols, need some mechanism for disambiguation. Such disambiguation mechanisms typically depend on software to determine what the user meant depending on context. Disambiguation may be combined with anticipation systems, which attempt not only to disambiguate what the user has already typed, but to predict what they intend to type next: attempting to complete a word or even a phrase before the user performs any actions to specify their next intent. Both disambiguation and anticipation may vary in aggressiveness, from attempting to disambiguate or anticipate a single key press, an entire word, or a sequence of words.

Some of the various aspects and features herein disclosed can be combined to provide a useful method for making alternate disambiguation and/or anticipation methods with different underlying technology and different degrees of aggressiveness available to the user to choose moment to moment at will. For concreteness and without intent to limit, we will choose two disambiguation mechanisms among the many disambiguation and/or anticipation system conceivable: a) a letter-by-letter disambiguation system such as taught by U.S. Pat. No. 6,219,731, entitled "Method and apparatus for improved multi-tap text input" to Gutowitz, hereby incorporated by reference in its entirety, and b) some word-by-word disambiguation mechanism such as simple dictionary lookup. We will use switch between them using the swipe-switch [1202]. Unless [1202] is swiped, the system operates in a word-wise disambiguation mode. The word-wise disambiguation mode presents the most-likely word corresponding to a keystroke sequence to the user first, and then allows alternates, if any, to be chosen. For instance, if the (hjk,i, m) keys are pressed in succession, the system will propose the interpretation "him", which will most often be the correct choice. When there are alternates available, the word may be displayed in a distinctive font, a bell may be rung, or some other method used to signal the user that alternatives are available. When there are alternatives, the user may "Next" through the alternatives in some manner. Here, for illustration, we will use a tap on [1210] to indicate "Next". Thus, in this non-limiting example, when the word "him" is presented and the user taps on [1210], the alternate disambiguation "kim", and if the user taps again, the alternate interpretation "jim" will be presented. When [1202] is swiped, the system switches from word-wise disambiguation to letter-wise disambiguation. Swipe up on [1202] and hold in [1210] with be an EOS-hold, with the same symbol set as used for EOS-hold for capitalization, and, similarly, swipe down on [1202] will be an EOS-lock with the same symbol set as used for EOS-lock of capitalization. As long as the system is in letter-wise disambiguation mode, a tap on [1210] will present the next alternative letter, if any, rather than the next word which was the case in word-wise disambiguation mode. If there are alternate letters available, that fact may be indicated to the user by rendering the nextable letter in a distinctive font, or some other means.

In view of the foregoing, various alternatives should be appreciated. It could be that both letter-wise and word-wise modes are simultaneously active. In which case, we make use tap on [1210] to return the next letter, and double-tap on [1210] to return the next word. It may be that the two disambiguation systems are both "letter by letter" though one operates on one symbol set, the other on another. A non-limiting example is described in US patent application "Method and Apparatus for Text Entry Based on Trigger Sequences", U.S. application Ser. No. 10/605,157 hereby incorporated in its entirety by reference. That document teaches, among other things, a system for entering pinyin and converting the pinyin to Chinese Hanzi. Both the pinyin symbols and the Hanzi systems are nextable, which might be accomplished by single and double taps, or some other means. It may be advantageous to add any word or sequence entered in one disambiguation mode to the database of the other disambiguation mode. For instance, a word "spelled out" in letter-by-letter mode, could be added to a user dictionary for the word-by-word mode. Similarly, a next-word anticipation system might receive data from word-by-word disambiguation mode whenever the user uses "Next" to correct a wayward anticipation.

Sensory Marking of Keyboard Swipe-Switches

A keyboard comprising a swipe-switch may provide no sensory information as properties of the swipe-switches it contains, such as their location, type of swipe, or direction of swipe. There may be no sensory feedback when a swipe-switch has been activated. The user may simply learn that performing a given type of swipe in a given way activates a certain swipe-switch. However, it may be desirable to provide sensory, (such as visual, auditory, and/or tactile) for swipe-switch properties, such as location, type of swipe, and/or direction of swipe, as well as sensory feedback for when and how a swipe-switch has been activated.

Figure 13:
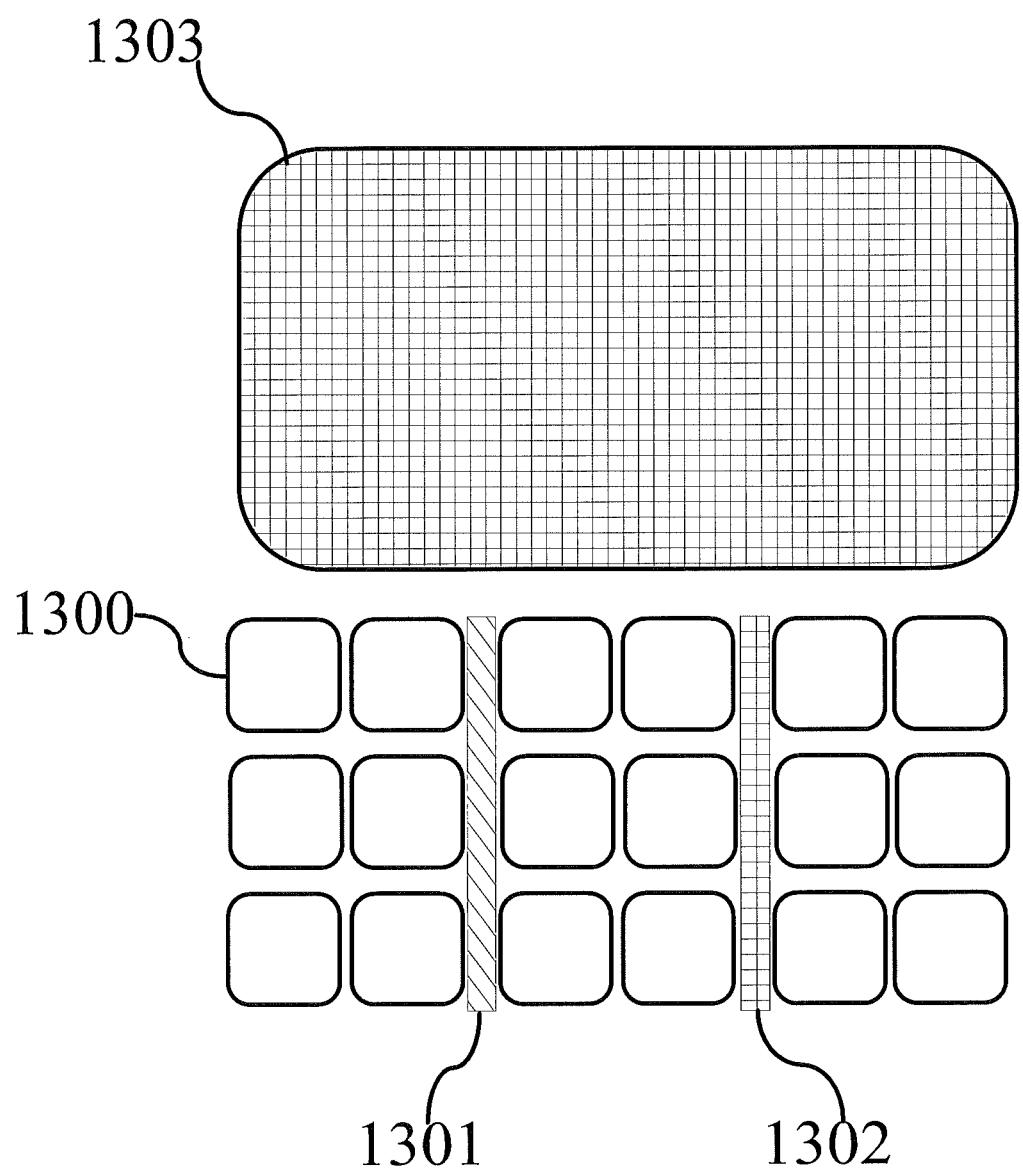
FIG. 13. An illustrative keyboard comprising swipe-switches and color coding of switch states.

An illustrative non-limiting example is shown in FIG. 13. Here a keyboard [1300] comprises two swipe-switch-hold controls [1301] and [1302] each of which performs some keyboard function. The "hold" part of both controls is set to be the display screen [1303]. For the sake of illustration, let us assign the function "digit mode" to [1301] and "capitalization mode" to [1302]. That is, when [1301] is swiped upwards, the keyboard [1300] switches from inputting letters to inputting digits. The keyboard is configured such that it will return to letter mode after a digit is selected, unless the swipe is held in the display screen [1303], in which case the keyboard will continue to input digits as long as the swipe is held. Similarly, when [1302] is swiped upwards, the keyboard [1300] switches from inputting lowercase letters to uppercase letters. The keyboard is configured such that it will return to lowercase letter mode after a uppercase letter is selected, unless the swipe is held in the display screen [1303], in which case the keyboard will continue to input uppercase letters as long as the swipe is held.

In FIG. 13, each of the swipe-switch-hold controls [1301] and [1302] are visually marked by a distinct color (shown in FIG. 13 as hatch patterns). These markings guide the user to swipe in the correct place to perform the desired action. Preferably, the hold portion of the swipe-switch-hold control is also colored in the same way as the swipe portion, for as long as the swipe is held. FIG. 13 shows the state of the device when [1302] has been swiping, and holding is continuing in the display screen [1303]. If the other swipe-switch-hold control [1301] had been activated, then the display screen [1303] would take on the color associated with [1301] instead, for as long as the hold continues.

FIG. 13 is meant merely as an illustrative non-limiting example of how sensory signals may be associated with swipe-switches. It will be appreciated that other kinds of swipe-switches might call for other kinds of visual labeling and further appreciated that auditory or tactile markings could be used as well, in addition or instead of the visual markings. For instance, a swipe-switch-hold could emit a sound when swiped, a different sound when held, and a third sound when released. Different swipe-switches could be associated with different sound patterns, making them operable by the blind. An embossed ridge or roughening of the surface could be used as a tactile marking of the swipe region, and so on in ways a person skilled in the art will appreciate, and all such sensory markings are enabled within the scope of the present detailed description.

An Ipod Controller Enhanced with Swipe-Switches

Figure 14:
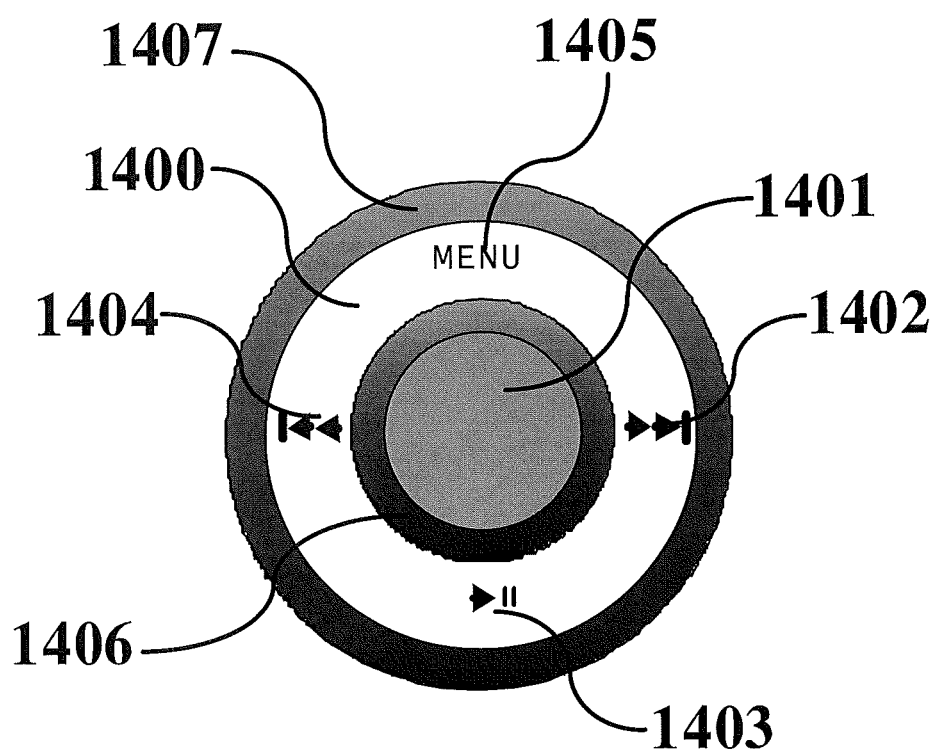
FIG. 14. An illustrative keyboard comprising a swipe control, switches and swipe-switches.

Turning now to FIG. 14, we present an illustrative embodiment which demonstrates that the present disclosure describes not only conventional typewriter keyboards and not only standard rectangular arrays of keys. It further emphasizes that swipe-switches need not be based only on simple linear swipes. This present illustrative embodiment is an enhancement of the controller typically found on devices trademarked under the name of ipod by the Apple Corporation. The ipod controller comprises a swipe control [1400] and an array of 5 buttons [1401-1405]. In the present embodiment, the ipod controller is enhanced by the addition of one or more swipe-switches, e.g. the circular swipe-switch [1406] which is inserted between the central button [1401] and the swipe control [1400] and the circular swipe-switch [1407] which surrounds the swipe control [1400]. As illustrated in previous embodiments, one of the uses of swipe-switches taught by the present embodiment is to enter a symbol or create an event, and another is to change the function of other controls such as regular switches. In the case of use as symbol entry or event creation, one could use, for non-limiting example the swipe-switch [1406] to mute the sound when swiped clockwise, and to unmute when swiped counterclockwise. Other potentially useful events of this nature include zooming or unzooming of the display, or locking or unlocking the keyboard.

In the case of using swipe-switches to change the function of other controls, we can see that the swipe-switches [1406] and [1407] could be used to change the function of the swipe control [1400] and/or one or more of the 5 buttons [1401-1405]. For non-limiting example, one of the swipe-switches [1406] and/or [1407] could change the function of the 5 buttons [1401-1405] so that they may be used for text entry, for instance according to the teachings of the '317 patent, hereby incorporated by reference. In one of the embodiments described in that patent, 4 or 5 keys alone are shown to be sufficient for high quality text entry. Text entry would be useful in the case of a portable music player for the sake of searching for and/or tagging stored music items. The swipe-switches [1406] and/or [1407] could also change the function of the swipe control [1400]. As currently embodied in the Apple ipod, the swipe control [1400] changes function according to mode, the available modes being cycled through by repeated presses of the central button [1401]. E.g. in one mode the swipe control is used to adjust the volume, in another to variably fast-forward or rewind the current musical selection. These repeated presses could be eliminated for some modes, since the swipe-switches could give direct access to the modes. Using both of the swipe-switches [1406] and [1407] for this purpose, and arranging it so that clockwise and counterclockwise swipes give access to different modes, 4 modes could be accessed directly, avoiding the repeated presses on the central button [1401]. If the system is configured so that the swipe-controls give access to different modes when swiped together, then an additional 4 modes could be access directly, for a total of 8 direct access modes. This number of modes is large enough to be cumbersome to access using repeated presses of a single button, but can be accessed immediately and easily using the teachings of this present embodiment. If, rather than changing modes of the swipe control, concurrent swipes of the swipe-switches is used to change the behavior of the 5 buttons, then, in effect, 40 (8×5) additional buttons are created from the addition of just two swipe-switches. This illustrates once again some of the surprising and powerful aspects herein described and enabled, the scope of which is not limited by the various illustrative embodiments which have been described in detail to particularly point out various aspects and features sufficiently to enable a person of average skill in the art to make and use them, but rather by the appended claims.

An Ipod Controller Enhanced with Swipe-Switches, and with Text Entry Capability

Figure 15:
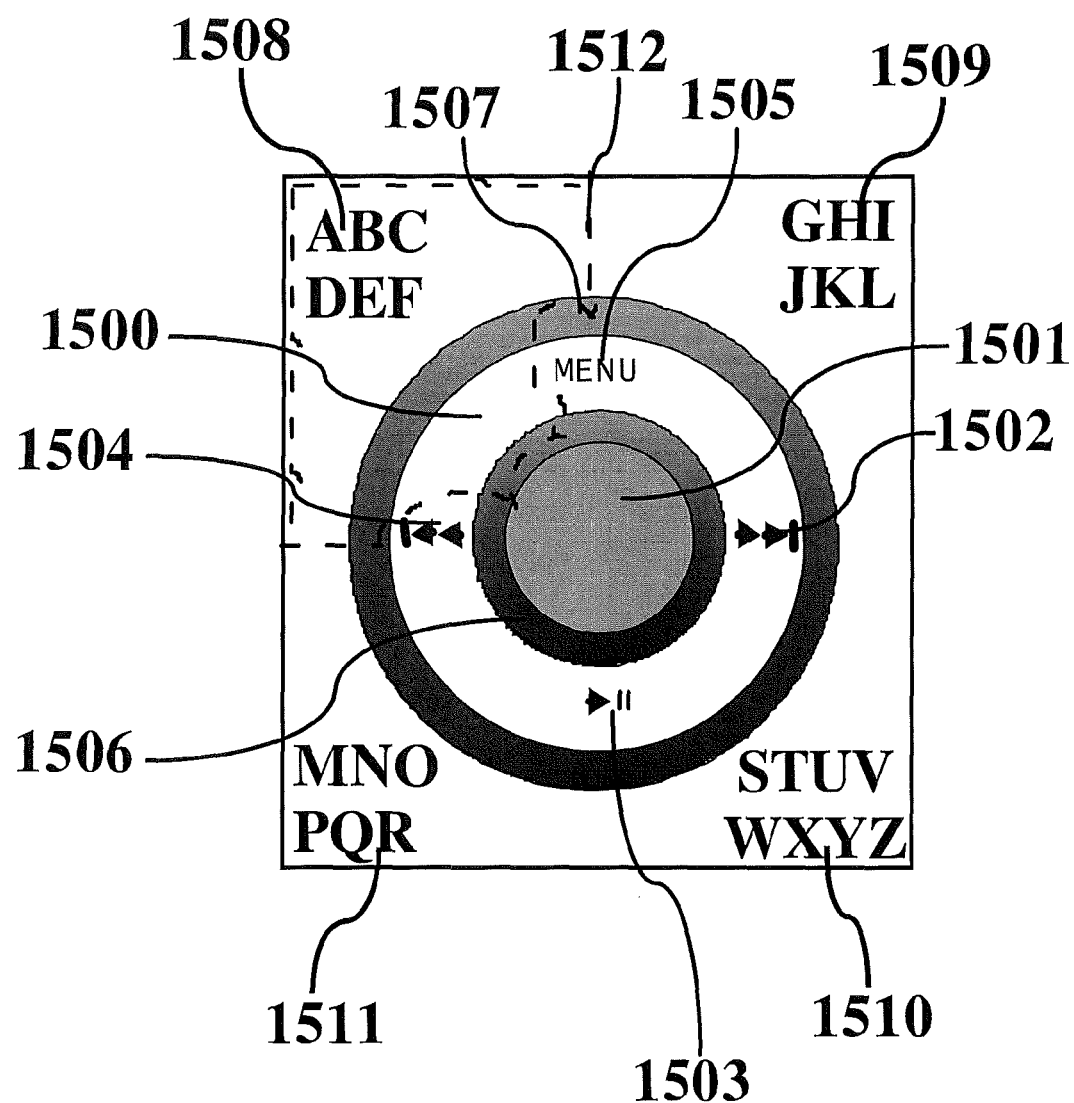
FIG. 15. An illustrative keyboard comprising a swipe control, switches, swipe-switches, and an ambiguous keyboard.

Turning now to FIG. 15, we present an enhanced ipod controller with swipe-switches and text-entry capability. The elements [1500-1507] have equivalent functions to their counterparts in the embodiment of FIG. 14. In particular, [1500] is a swipe control, [1501-1505] are buttons, and [1506-1507] are swipe-switches. To these various elements, we add 4 buttons [1508-1511] for the entry of letters A-Z. These buttons may overlap with the various swipe controls and swipe-switches, in that a press anywhere on the surface may be associated to one of the buttons, either the original set of 5 buttons [1501-1505] and/or the set of text-entry buttons [1508-1511]. The approximate area in which a press would be associated with the button [1508] is shown by the dashed line [1512]. The area [1512] is set so that it is as large as possible, while allowing the other buttons to be activated also. The buttons [1509-1511] have similar receptive fields for key presses, which, for the sake of readability of the figure, are not shown.

In this text-entry system, as described in U.S. Pat. No. 6,885,317 incorporated by reference in its entirety above, each letter is input by a combination of two keypresses, using a multi-level ambiguous code. In this non-limiting example multi-level ambiguous code, a press of the button [1508] could mean any of the letters A-F, a press of the button [1509] could mean any of the letters G-L, and so on. In FIG. 16, it is shown how the second key press serves to further indicate which letter the user intends to enter. The panels of FIG. 16, namely, 16A-16D show the letter assignments after pressing the buttons [1508-1511] respectively. For instance, after [1508] is pressed a first time, the letters A-F are distributed over the buttons [1508-1511] as shown in FIG. 16A. Now, if the user desires to input the letter F, they would press button [1510]. If, instead, they desired to input the letter E, they would press button [1509] instead. Since the code is ambiguous, the second press of [1509] could also mean the letter B. This ambiguity can be resolved by disambiguation software. Thus, any of the letters A-Z can be input using two key presses, the first to select a large group of letters, and the second to select a smaller group from the first-selected large group. Since, in this embodiment, we have arranged for the buttons [1501-1505] to be available for input at the same time as the buttons [1508-1511], as well as the swipe-switches [1506-1507], and the swipe control [1500], any or all of these could be used to perform other text entry functions, such as entry of digits and punctuation, and/or to change the symbol assignments to [1508-1511] for further enhanced text entry. It is to be appreciated that this embodiment is not limited to text entry in the Latin alphabet, and could be used to enter any subset of Unicode, nor is it limited to the use of an ambiguous code, or four buttons for text input.

A Keyboard Incorporating a Fixed Set of Swipe-Switches, and Alternate Keyboard Arrays We have already seen that a localized swipe-switch localized within a regular array of keys need might be localized in-phase or out-of-phase with the periodicity of the keyboard array. Indeed, neither the keyboard nor the swipe-switches need have any periodicity at all, and if they do, these periodicities need not correspond. To further explore this aspect, this present embodiment comprises a fixed set of localized swipe-switches, with variable keyboard arrays. One of the keyboard arrays used in this embodiment is the keyboard array we have already seen from FIG. 12, the keyboard array [1200]. FIG. 12 also showed a set of localized swipe-switches, namely [1201-1209] and a display [1210] all of which we will continue to use, for the sake of illustration, in this present embodiment. Turning now to FIG. 17, we see these previous elements combined with two new keyboard arrays [1700-1701]. The keyboard arrays [1200], [1700] and [1701] have different numbers of rows and/or columns, and different letter-to-key assignments, yet the array of swipe-switches is the same and used by all. In particular, while [1200] has 6 columns and three rows of keys with a Qwerty layout, [1700] has three rows and three columns of keys with a Qwerty layout (FIG. 17A), and [1701] has two rows and two columns of keys, with an alphabetic order layout, and operates in the way described in reference to FIGS. 15 and 16 (FIG. 17B). In this embodiment, the user could switch between these keyboard arrays as desired. Since the various keyboard arrays differ, but the keyboard arrays change, at least some of the spatial relationships between localized swipe-switches and keys must change as the keyboard array changes.

Figure 18:
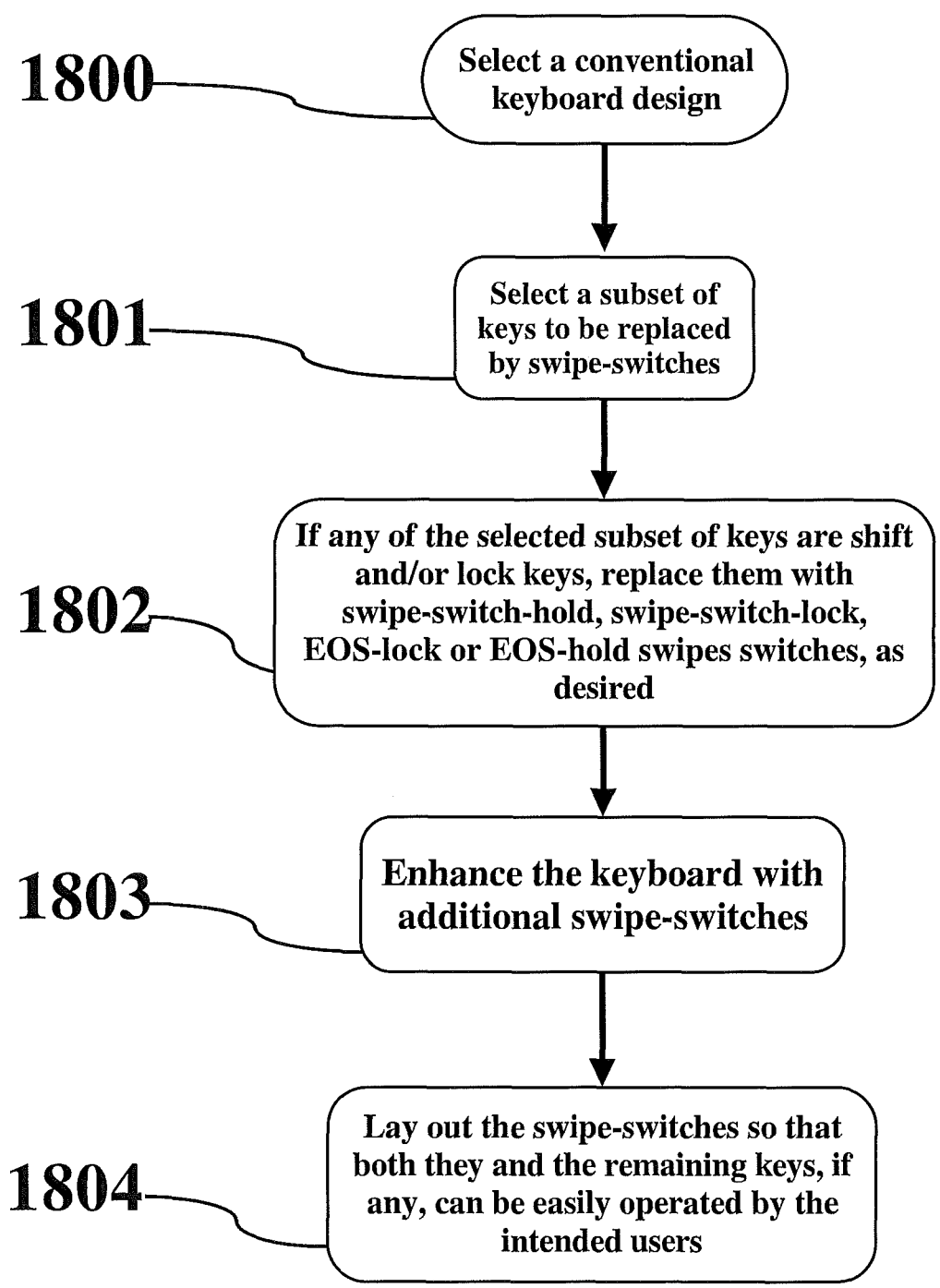
FIG. 18. A method for designing a keyboard comprising swipe-switches from a keyboard comprising switches.

A Method for Designing a Keyboard Comprising Swipe-Switches from a Keyboard Comprising Switches We turn now to an embodiment of an illustrative method for designing a keyboard containing swipe-switches based on a conventional design for a keyboard comprising switches only. Turning to FIG. 18, the method comprises the steps of [1800], selecting a conventional keyboard design on which the design is to be based, [1801], selecting a subset of keys from the keyboard of [1800] to be replaced by swipe-switches, [1802] Determining if any of the keys selected at step [1801] are shift and/or lock keys, and, if they are, determining if they should be replaced by swipe-switch-holds or swipe-switch-locks, and/or EOS variants thereto, and doing so if desired, [1803] optionally, if desired, enhancing the keyboard with further swipe-switches performing functions unavailable or available only with difficulty from the original conventional design, [1804] laying out the swipe-switches selected at the previous steps, along with the remaining, non-replaced switches so that all of them can be operated easily by the intended users.

A Method for Using a Keyboard Comprising Swipe-Switches

Figure 19:
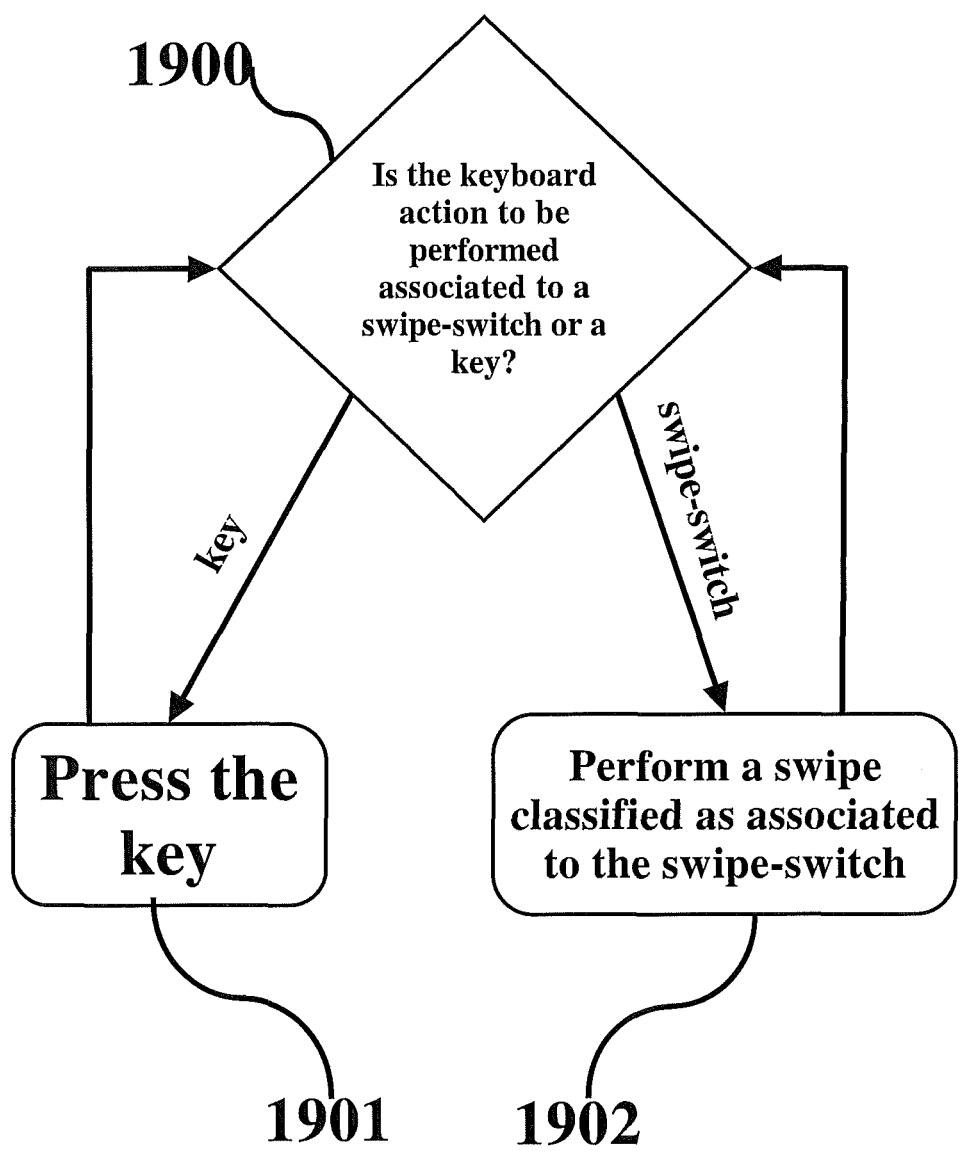
FIG. 19. A method for using a keyboard comprising swipe-switches.

Turning now to FIG. 19, we see an overview of a method for using a keyboard comprising swipe-switches. The method to be applied by the user is to determine, at step [1900] whether the keyboard action desired to be performed is implemented as a key or a swipe-switch. If it is determined to be implemented as a key, then, at step [1901] the key is pressed, and the user returns to step [1900] in reference to the next intended keyboard action. If it is determined to be implemented as a swipe-switch, then the user performs, at step [1902] a swipe with the intention that it be classified as a swipe associated to the swipe-switch implemented the intended keyboard action, they then return to [1900] in reference to the next intended keyboard action.

Figure 20:
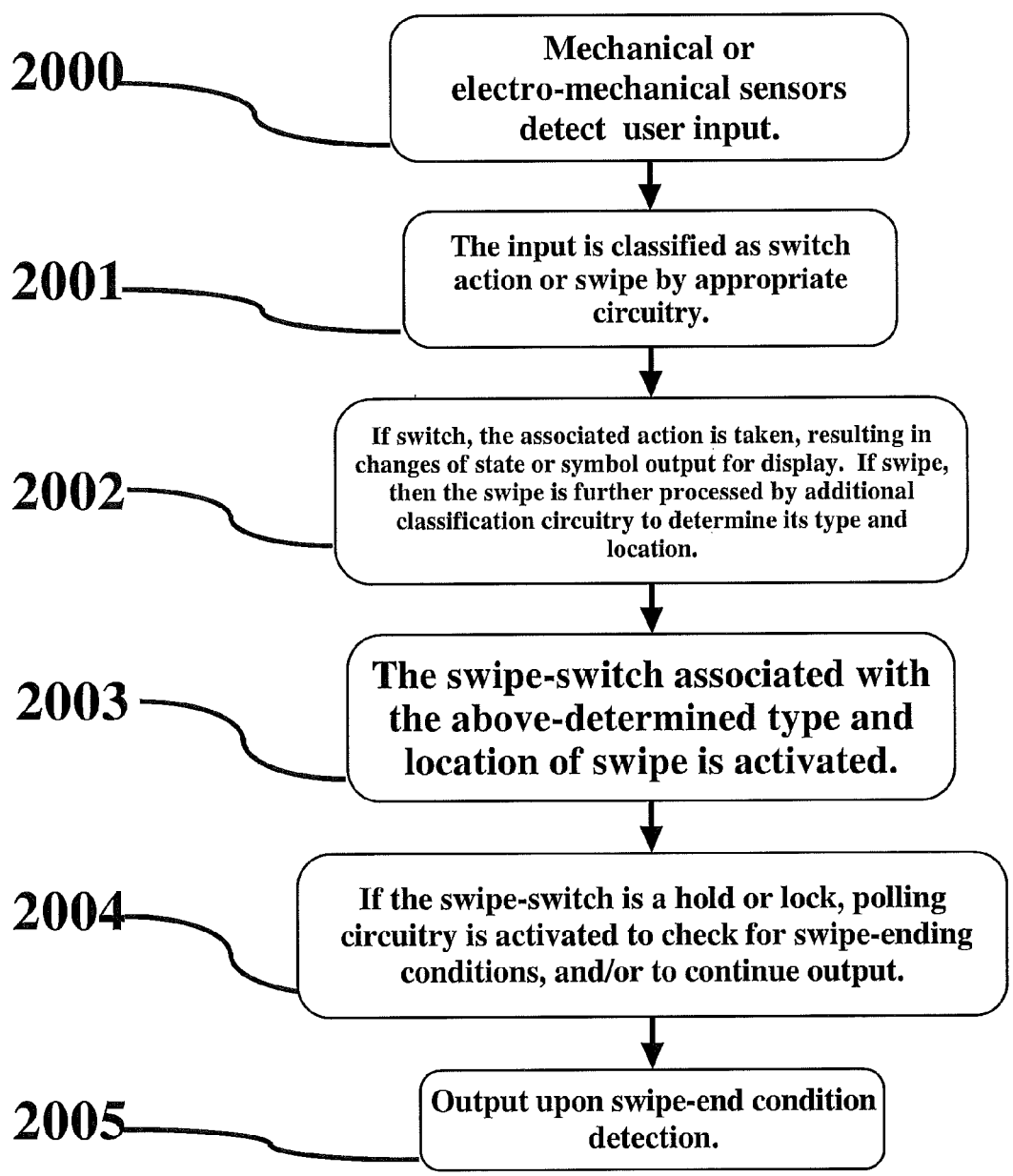
FIG. 20. An overview of an apparatus incorporating swipe-switches performing keyboard actions.

An Overview of an Apparatus Incorporating Swipe-Switches Performing Keyboard Actions Turning now to FIG. 20, we see a broad overview of the operation of an apparatus comprising a keyboard comprising swipe-switches. In this apparatus, [2000] mechanical or electro-mechanical sensors detect user input. The sensors might be switches, such as keys detecting key presses, or swipe-switches detecting swipes. The input is classified [2001] as a switch action or a swipe by appropriate circuitry. If the input is classified as a switch, then [2002] the apparatus performs the required action, which could be e.g. the output of a symbol for display or a change of state of some part of the apparatus. If the input is classified as a swipe, then further processing is performed to classify the swipe by type and/or location. Then, [2003], given that the input was a swipe and has been classified as associated to a given swipe-switch, the associated swipe-switch is activated. The activated swipe-switch may have been a swipe-switch-hold or swipe-switch-lock, in which case the state of the hold or lock must be polled at some interval to determine if it is still active [2004], depending on the nature of the swipe-switch action, output may continue for as long as a swipe-ending condition is not detected. Finally, at [2005], further output may occur when a swipe-ending condition is detected.

An Overview of Hardware Aspects

Figure 21:
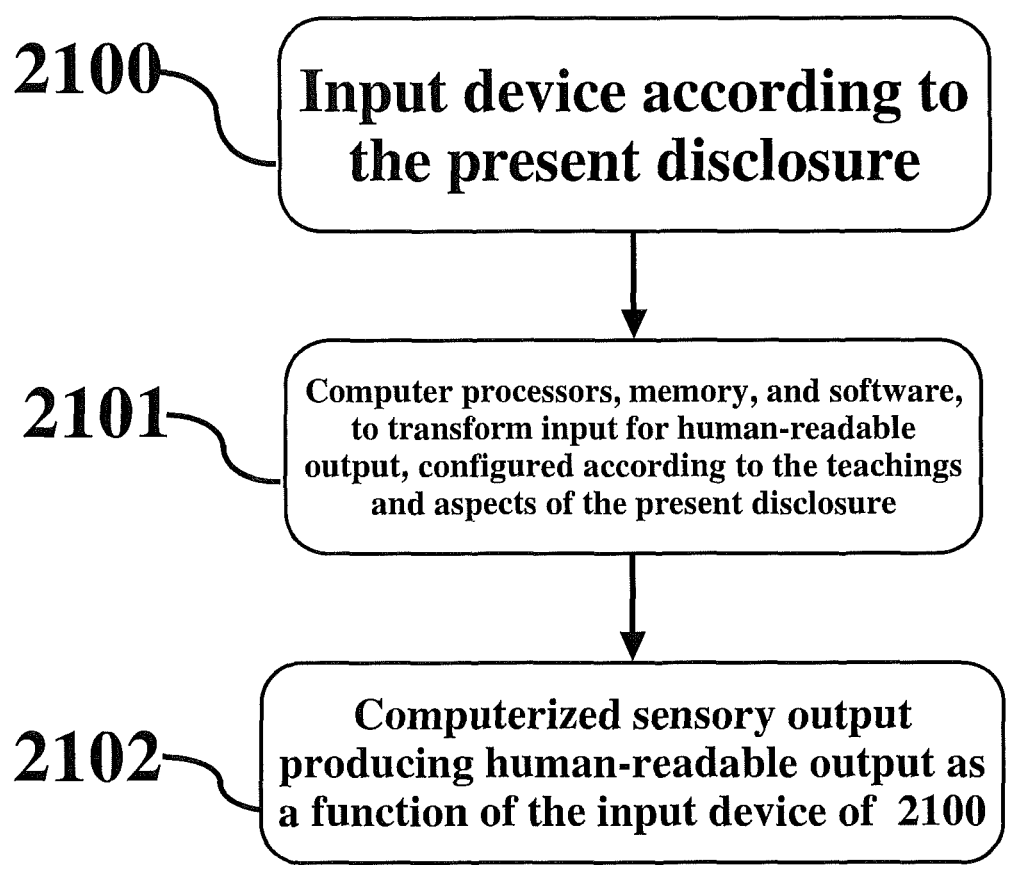
FIG. 21. An overview of hardware aspects.

For a general overview of the hardware aspects, we turn to FIG. 21. Here we see that the hardware comprises an input device [2100] as described in the present disclosure, various computer processors, memory, and software [2101] to transform input for human-readable output, configured according to the teachings and aspects of the present disclosure, and [2102] computerized sensory output producing human-readable output as a function of the input device [2100].

Please note that embodiments of the present Application may be formed within these elements or with aid of these elements of FIG. 21, and that individual aspects of the Specification may be at least in part embodied within these elements. Although illustrated as integrated, in other embodiments, these above-discussed elements may be coupled but separate. Furthermore, other aspects of the present Specification, such as an activation mechanism, can be integrated within one or more of these elements, such as found in FIG. 5 or FIG. 23, or other FIGS. of the present Specification.

A Method for Manufacturing a Keyboard Comprising Swipe-Switches

Figure 22:
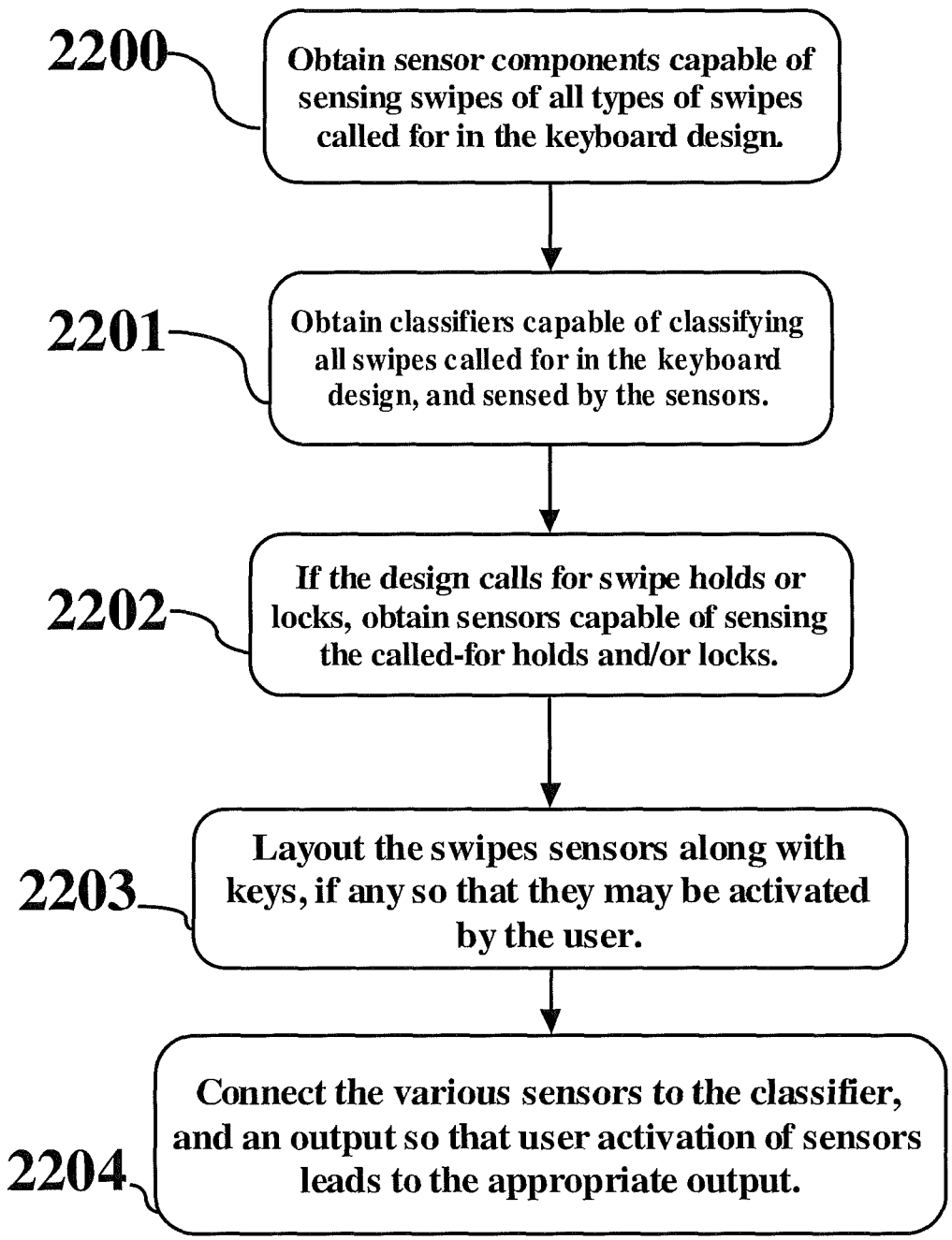
FIG. 22. A method for manufacturing a keyboard comprising swipe-switches.

Turning now to FIG. 22, FIG. 22 teaches a method for manufacturing a keyboard comprising swipe-switches. According to the method, the manufacturer begins at step [2200] by obtaining sensor components capable of sensing swipes of all types of swipes called for in a keyboard design which they wish to manufacture. If the design contains regular switches, these should also be sourced at this step. The manufacturer may then obtain, at step [2201] classifiers capable of classifying all swipes called for in the keyboard design, and sensed by the sensors obtained at step [2200]. If the design, in particular, calls for swipe-switch-holds and/or swipe-switch-locks2, then at [2202], the manufacturer obtains sensors capable of sensing the called-for holds and/or locks. Next, at step [2203], the manufacturer lays out the swipe sensors along with keys and other called for elements so that any of the sensors may be activated by the intended users. Then, at step [2204], the manufacturer operatively connects the various sensors and classifiers to an output, such that user activation of the sensors leads to the appropriate human-readable output.

Figure 23:
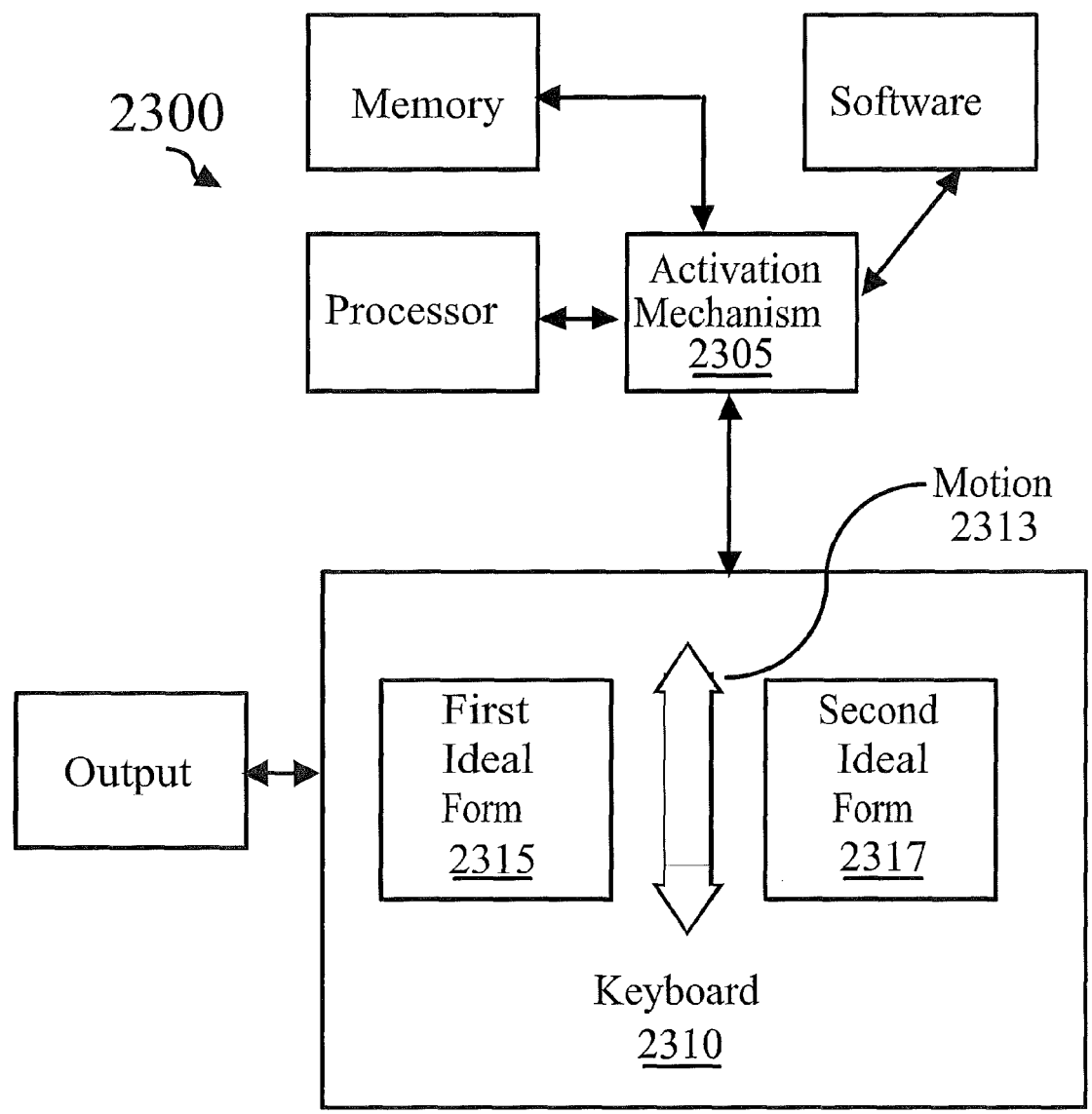
FIG. 23. Interaction of memory, processors, activation mechanisms, keyboard, and swipe classifiers.

Turning now to FIG. 23, FIG. 23 teaches a further embodiment of a keyboard system 2300. Given a set of ideal forms for swipes, deciding which ideal form is intended by the user when they make an actual swipe can be computed by a variety of means. One preferred method is to use an inverse square or cube law attractive force between two lines, such as first ideal form 2315 and second ideal form 2317, regarding 1) the actual swipe, such as motion 2313, 2) each of the ideal forms to which the actual swipe might correspond, such as ideal form 2315 and second ideal form 2317 as determined by an activation mechanism 2305, and to then calculate the swipe that was intended by a user on a keyboard 2310. For example, first ideal form 2315 could be a single swipe in an upwards direction in a part of the keyboard, and the second ideal form 2317 could be a circular motion in a different part of the keyboard. Activation mechanism 2305 can be coupled and employed with various elements of FIG. 21.

The attractive force may be integrated over the curves of actual swipe and ideal swipes, and the ideal form with the greatest attraction is chosen. Such attractive forces are familiar to those skilled in the art of physics, and variations to a full line integral will be appreciated by those skilled in the art. For instance, the attraction function could be augmented with thresholds in length, diameter, direction or other parameters to make the "capture" of an actual swipe such as motion 2313 by the ideal for which the user intended to be most likely, and to increase the discrimination between ideal forms. The details will depend on the actual resolution and sensitivity of hardware, the number of ideal forms, their similarity to each other, and so on. The detailed engineering of the attraction will, in general, need to take these aspects into account.

Figure 24:
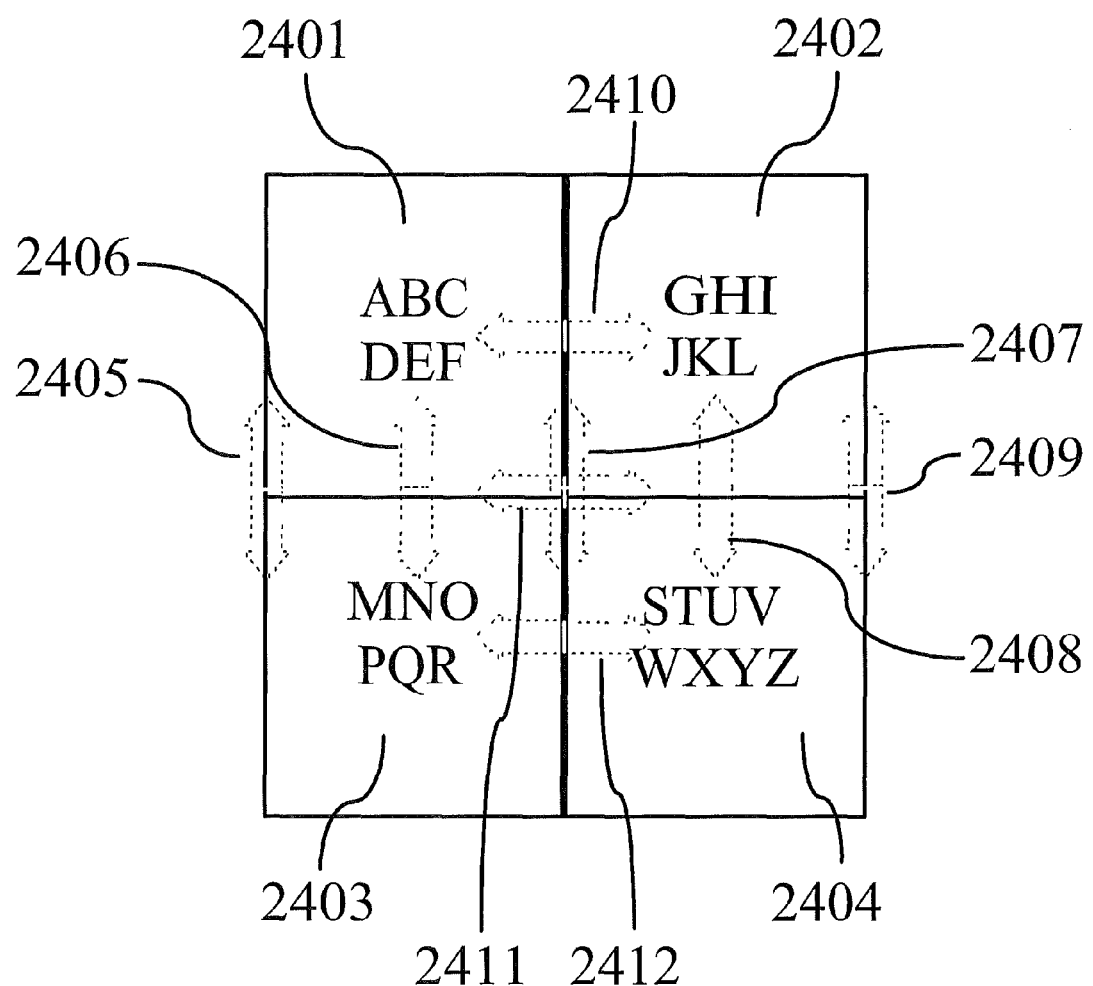
FIG. 24. An embodiment 4-square with multi-level code—with swipe switches.

In FIG. 24, we present an illustrative non-limiting example of a keyboard with swipe-switches and text-entry capability. In this figure, [2401-2404] are buttons for the entry of text comprising letters A-Z, and [2405-2412] are swipe-switches for the entry of symbols and mode changing. As in previous illustrative examples, the buttons may overlap with the various swipe controls and swipe-switches. The swipe switches may have a visual or auditory representation, or none at all. For didactic purposes, they are represented in FIG. 24 as dotted open arrows along the preferred direction of swipe. For the sake of this illustrative example, the ideal forms of these swipe switches are linear, either vertically [2405-2409] or horizontally [2410-2412] oriented. Any of these swipe switches could be swipe and hold switches. An illustrative non-limiting example assignment of swipes to functions or symbols is as follows: digit mode [2405], letter-by-letter text entry mode [2406], space (upwards swipe)/backspace (downwards swipe) [2407], capitalization [2408], punctuation mode [2409], period/comma (for rightwards and leftwards swipe respectively) [2410], space/backspace [2411], and exclamation point/question mark [2412].

Figure 25:
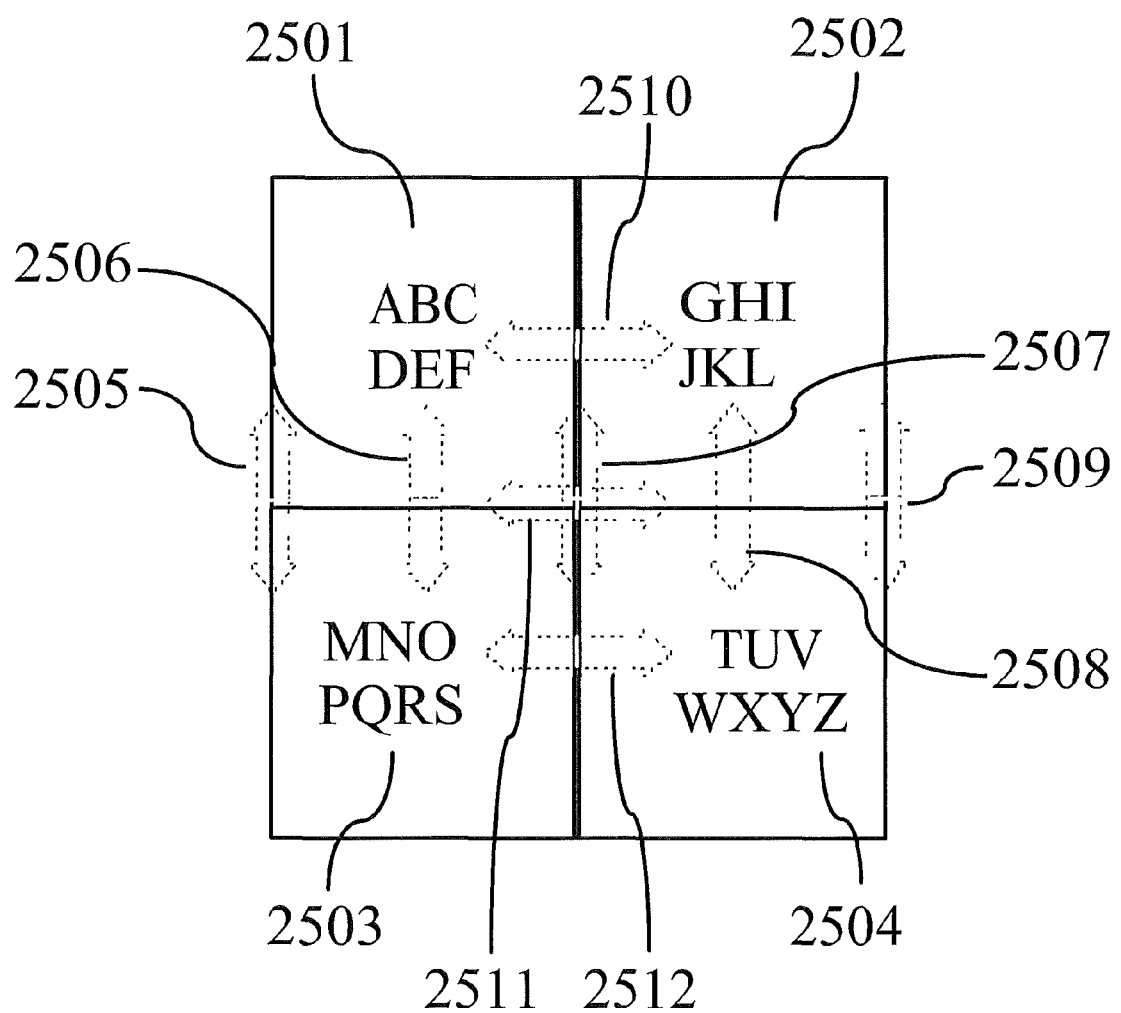
FIG. 25. An embodiment of FIG. 24 with S in a selected place that should be familiar to a telephone operator.

FIG. 25 represents a multi-level text input system, as described above in detail for the corresponding buttons of FIG. 15. That is, to enter a letter, first the required button from the set [2401-2404] is pressed, then the letters from that button are redistributed over the four buttons, and the same letter is selected again. As already mentioned, this two-sequential-stroke system allows 4 buttons to behave as if they were 16 buttons, resulting in low ambiguity text entry.

Turning now to FIG. 25, we see a non-limiting illustrative embodiment of a text entry system which is the same as that of FIG. 24, except that the letter S has been moved from the 4th button [2504] to the 3rd button [2503].

Clearly, the re-assignment of S in the first level of the multi-level text entry system will entail a corresponding reassignment on the second level as well (not shown). Otherwise, buttons [2501-2504] and swipe switches [2505-2512] illustratively operate in the same way as their counterparts of FIG. 24. The advantage of placing S on the 4th key is to reduce ambiguity, while the advantage of placing S on the 3rd key, as is done in FIG. 25, is to align this keyboard with the standard telephone keypad for the Latin alphabet. Indeed, the mapping from telephone keypad to the buttons of FIG. 25 is by pairs: abc, def map to [2501], and so on to the pair tuv, wxyz mapping to [2504]. It should be appreciated that FIG. 25 is merely an illustrative example of mapping of telephone keys to buttons according to this aspect of this invention, and many variations are possible within the scope of the appended claims.

For further example, a standard telephone keypad for a different script, e.g. Cyrillic, would have a different mapping of telephone keys to the buttons [2501-2504] according to this aspect of this invention. Even standard telephone keypads with writing symbols assigned to more than 8 keys (e.g. the standard telephone keypad for Japanese) could be handled within the present scope: some of the buttons [2501-2504] could map to more than two telephone keypad keys.

Figure 26:
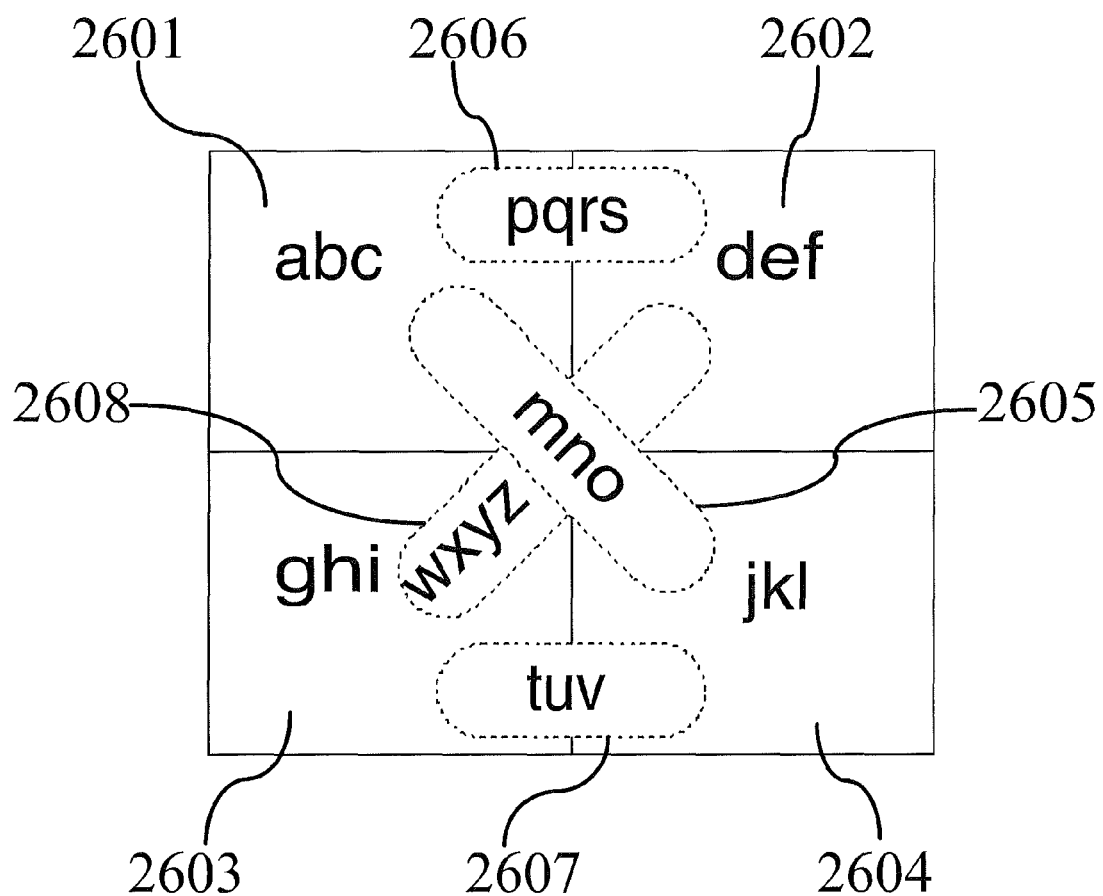
FIG. 26. An embodiment of a two-simultaneous-stroke, 4-square keyboard (abc . . . jkl with one stroke, the others with 2 simultaneous strokes).

FIG. 26 Turning now to FIG. 26 we see a further alternate embodiment of a 4-button keyboard. The keyboard of FIG. 26, like those of FIGS. 24-25 could comprise swipe switches as well, however, for the sake of readability, these have been excluded from FIG. 26. The buttons of FIG. 26 [2601-2604] may be operated one at a time, or several buttons pressed substantially simultaneously. When several buttons are pressed substantially simultaneously, the input symbols are generally different from the symbols input when the buttons are individually pressed or pressed in sequence. As a non-limiting illustrative example of this single/multiple-simultaneous-press embodiment, FIG. 2 shows the groups of letters abc, def, ghi, jkl being input by an individual press of the buttons [2601-2604]. The letters mno are input by pressing the buttons 2601 and 2604 substantially simultaneously. In FIG. 26, for illustration, the action of pressing two buttons substantially simultaneously is represented by a dotted oval crossing the relevant buttons, so that for instance mno are input using the action 2605.

Similarly, the letters pqrs are input using action 2606 which represents substantially simultaneous pressing of [2501-2502], the letters tuv are input by action 2607 linking 2603 and 2604, and the letters wxyz are input by action 2608 linking 2602 and 2604. Remarks made previously with respect to FIGS. 24-25 apply here as well: the assignment of letters to buttons need not follow the assignment of letters to keys on a standard telephone keypad to remain within the scope of this aspect of the invention, and if following a telephone keypad convention, need not be the telephone keypad convention for the Latin script. There are many telephone keypad standards for different scripts, and this aspect could be used with each of them.

Figure 27:
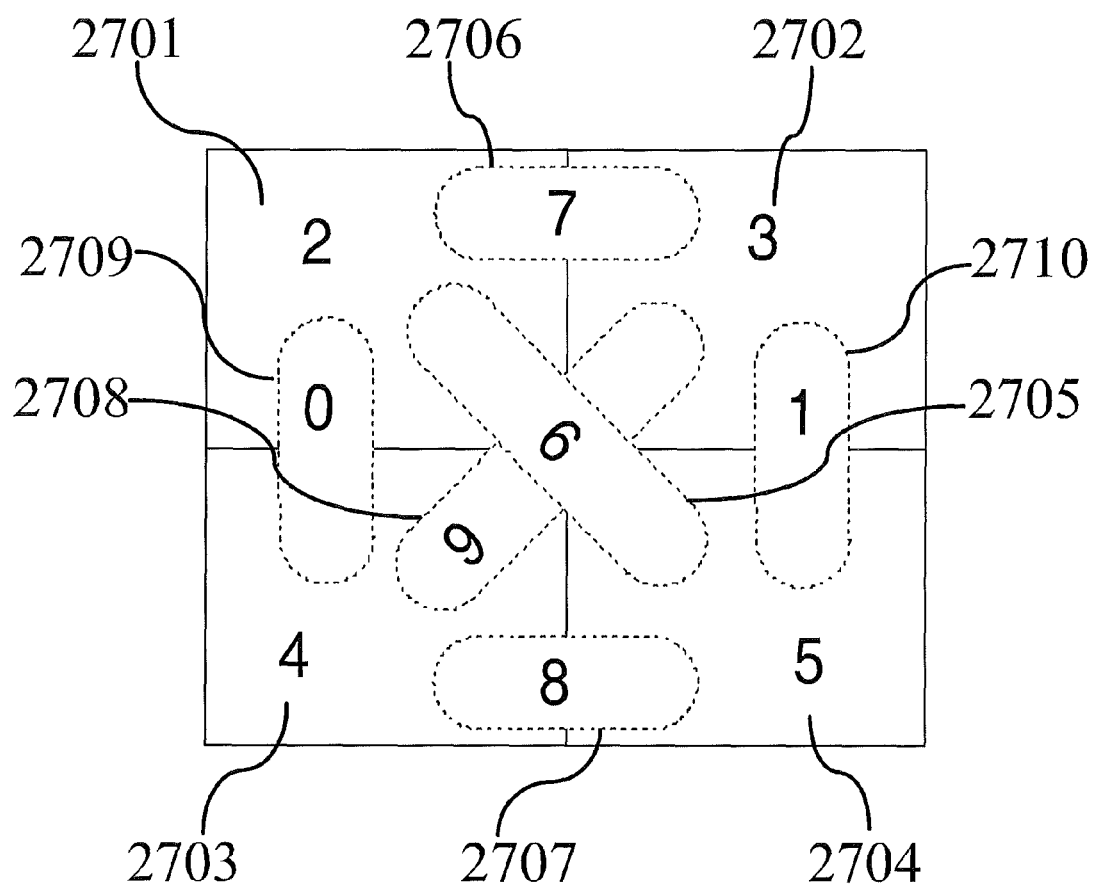
FIG. 27. An embodiment of Digit mode for FIG. 26

Turning now to FIG. 27, we see an illustrative non-limiting example of how digits can be input using the same framework of FIG. 26. The representational scheme if FIG. 26 is applied here as well. Thus, for example, 2701 represents is a single button, and 2706 represents the substantially simultaneous pressing of two buttons. The digits 2-9 are assigned to elements 2701-2708 respectively. This non-limiting example assignment was chosen to make the digit assignment correspond to the letter assignment of FIG. 26, and thus to further correspond to the assignment of the telephone keypad for Latin script. Other assignments are clearly possible within the scope of this aspect of this invention, and digits from other scripts would be differently assigned according to the teachings of FIG. 27, and may or may not follow the letter/digit assignment of the corresponding telephone keypad.

Figure 28:
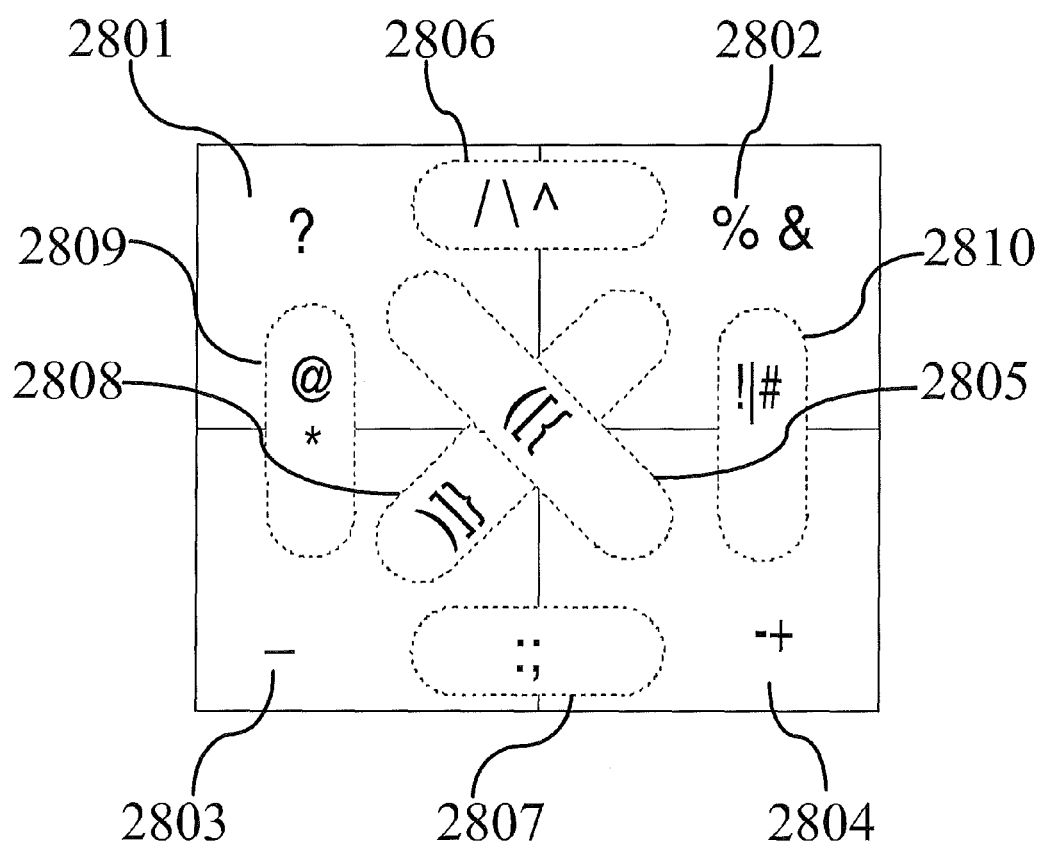
FIG. 28. An embodiment of Punctuation mode for FIG. 26.

Turning now to FIG. 28, we see an illustrative non-limiting example of an assignment of punctuation for the single/multi press aspect of the present invention. Here, for illustration, the punctuation symbols are assigned such that their shape corresponds as well as possible to the shapes of the digits in the corresponding digit mode, that is, morphic similarity, as is described in U.S. patent application Ser. No. 10/415,031 hereby incorporated by reference in its entirety. Thus the symbol ? resembles in shape the digit 2, and so is assigned to 2801, the symbols % and & resemble the digit 3 and so are assigned to 2802, resembles (part of) digit 4, and so is assigned to 2803, the symbols – and + resemble (part of) digit 5, and so are assigned to 2804. Carrying on in the same way, the symbols ([{ all resemble the digit 6 so assigned to 2805, the symbols ∧ and ˆ resemble the digit 7 (possibly with reflection), and so are assigned to 2806, the symbols : and ; resemble the digit 8 and so are assigned to 2807, @ and * resemble the digit 0 and so are assigned to 2809, and finally !

and | resemble the digit 1 and so are assigned to 2810. The # sign is additionally assigned to 2810 to complete the assignment of all punctuation symbols found on a standard telephone keypad to this illustrative punctuation mode.

What is claimed is:

1. An apparatus comprising
   i) a gesture recognizer capable of determining from a given actual gesture by a user which of a plurality of switches said user intended to activate and then activating said determined switch,
   ii) a symbol-input switch for inputting symbols, said symbol-input switch activated by taps,
   iii) a swipe-switch, said swipe-switch corresponding to an ideal form fixed in location, such that said gesture recognizer can determine whether said user intended to activate said swipe switch by quantitatively comparing said actual gesture to said corresponding ideal form in its said fixed location.

2. The apparatus of claim 1 comprising a symbol-input swipe-switch which inputs a symbol when activated.

3. The apparatus of claim 1 further comprising a regular array of symbol-input switches, said plurality of symbol-input switches comprising a plurality of modal switches, and further comprising a modal swipe-switch operating such that when said modal swipe-switch is activated just before or during activation of each said modal switch, said each modal switch changes mode, in that said each modal switch inputs a first said symbol when activated just after or during said activation of said modal swipe-switch and a second symbol when said swipe-switch is inactive or other said gestures have occurred and been recognized by said gesture recognizer since the last said activation of said modal swipe-switch.

4. The apparatus of claim 3 further comprising linear swipe-switches each activated when an associated linear swipe gesture is recognized by said gesture recognizer, and further comprising a hold area, said hold order beyond said regular array of symbol-input switches but adjoining it, in the direction of said linear swipes, said hold area operating to continue the activity of said linear swipe-switches when a said linear swipe is continued in a continuous motion into said hold area and held in said hold area, whereby said hold area performs a hold action for a said linear swipe-switch, said swipe recognizer together with said hold area forming a swipe-switch-hold control.

5. The apparatus of claim 1, comprising at least two swipe-switch each of which performs a first function when said gesture recognizer recognizes said at least two swipe-switches as being intended by said user to be activated individually, and said at least two swipe-switches collectively perform a second function when said gesture recognizer recognizes that said user intended to activate said at least two swipe-switches in conjunction.

6. The apparatus of claim 1 wherein said gestures recognizable by said gesture recognizer include at least one of: a vertical linear swipe, a horizontal linear swipe; an open arc; a path curved on itself; a zig-zag curve; a pull apart swipe; and a two-thumb swipe wherein thumbs move along parallel lines in opposite directions.

7. The apparatus of claim 6, wherein a said gesture recognizable by said gesture recognizer is a said horizontal linear swipe along a single row of said regular array of symbol-input switches.

8. The apparatus of claim 1, further comprising two distinct said swipe-switches, said two swipe-switches forming an array, in that each of said two distinct swipe switches is activated by a distinct said gesture, said distinct gestures of the same form but distinguished by their spatial location.

9. The apparatus of claim 3, further comprising at least one of: a swipe-switch activated in response to a linear gesture between two rows of said switches in said regular array and switches, a swipe-switch activated in response to a linear said gesture between two columns of said regular array of switches.

10. The apparatus of claim 3, wherein said regular array of switches comprising a plurality of said switches which input letters, said letters assigned to said switches following the within-row left-to-right order and letter-to-row assignments of a standard typewriter layout for a given natural language.

11. The apparatus of claim 10, where said standard typewriter layout is the Qwerty layout and said given natural language is English.

12. The apparatus of claim 1, wherein said swipe-switch is a lockable and holdable meta-key.

13. The apparatus of claim 12 wherein said lockable and holdable meta-key is at least one selected from a group comprising: a) an end of set (EOS) lock; and b) an EOS hold.

14. A keyboard comprising:
   i) keys for inputting symbols,
   ii) an activation mechanism sensitive to actual swipes by a user;
   iii) a keyboard coupled to said activation mechanism;
   iv) a plurality of ideal paths for swipes fixed in location and shape, said plurality localized at least partly within said keyboard, where said activation mechanism compares each of said actual swipes by a user to each of said ideal paths fixed in location and shape and then activates a switch corresponding to that said ideal path fixed in location and shape which best matches said actual swipe, implementing a swipe-switch.

15. The keyboard of claim 14, where said plurality of ideal paths fixed in location and shape includes at least two distinct said ideal paths fixed in location and shape which are linear paths substantially parallel to each other, and physically separated from each other sufficiently that said user can linearly swipe across said keyboard such as to perform said actual swipe such that either one or the other of said two distinct substantially parallel fixed ideal paths are matched to said actual swipe by said activation mechanism.

16. The keyboard of claim 14 where a plurality of said ideal paths fixed in location and shape are visually represented to guide said user to perform said actual swipe so as to cause said activation mechanism to likely match an intended one of said ideal paths fixed in location and shape.

17. The keyboard of claim 14, where at least one of said keys for inputting symbols inputs a first symbol when tapped alone, and inputs a second symbol when said at least one swipe-switch is activated just before or during a tap on said at least one key for inputting symbols.

18. The keyboard of claim 14 further comprising a hold area, said hold order beyond said keyboard but adjoining it, such that any said ideal path fixed in location and shape which continues into said hold area is such that when it is matched to a said actual swipe which continues to be held in said hold area, then any action performed by said swipe-switch implemented by said ideal path is continued as long as said actual swipe is held in said hold area, said activation mechanism together with said hold area forming a swipe-switch-hold control.

19. The keyboard of claim 14 where at least one of said ideal paths fixed in location and shape is along one row or column of said keyboard.

20. A keyboard, comprising:
   four quadrants each representing a key, with a first assignment of letters to each of said quadrants, said letters to be input when each of said quadrants is tapped, said first assignment of letters equal to a first assignment of letters to four keys of a standard telephone keypad, and wherein said four quadrants may also be tapped in pairs, each said pair inputting letters when tapped, and such that a second assignment of letters is made to each of said pairs, said second assignment of letters being equal to a second assignment of letters to a second set of keys of a standard telephone keypad, whereby a standard telephone keypad with letters assigned to up to 10 keys can be emulated with said four quadrants.

* * * * *